(12) United States Patent
Davis et al.

(10) Patent No.: US 6,760,756 B1
(45) Date of Patent: Jul. 6, 2004

(54) DISTRIBUTED VIRTUAL WEB CACHE IMPLEMENTED ENTIRELY IN SOFTWARE

(75) Inventors: Scott H. Davis, Groton, MA (US); Daniel J. Dietterich, Acton, MA (US); Paul D. Asselin, Hopkinton, MA (US); Gerard R. Plouffe, Hollis, NH (US); Phillip John Romine, Framingham, MA (US)

(73) Assignee: MangoSoft Corporation, Nashua, NH (US)

( * ) Notice: Subject to any disclaimer, the term of this patent is extended or adjusted under 35 U.S.C. 154(b) by 736 days.

(21) Appl. No.: 09/598,546

(22) Filed: Jun. 21, 2000

Related U.S. Application Data

(60) Provisional application No. 60/140,645, filed on Jun. 23, 1999.

(51) Int. Cl.[7] .............................................. G06F 13/00
(52) U.S. Cl. ............................ 709/215; 707/1; 707/100
(58) Field of Search .................................. 709/213, 215; 707/1, 100

(56) References Cited

U.S. PATENT DOCUMENTS

| | | | | |
|---|---|---|---|---|
| 5,909,540 A | * | 6/1999 | Carter et al. | 714/4 |
| 5,918,229 A | * | 6/1999 | Davis et al. | 707/10 |
| 6,026,474 A | * | 2/2000 | Carter et al. | 711/202 |
| 6,112,279 A | * | 8/2000 | Wang | 711/119 |

\* cited by examiner

*Primary Examiner*—Kenneth R. Coulter
(74) *Attorney, Agent, or Firm*—Proskauer Rose LLP

(57) ABSTRACT

A method and system are provided for optimizing the local caching of one or more data components available from a server node. Each of plural nodes connected to a local area network is provided with a locally physically present cache. Each of the caches of at least some of the plurality of nodes are linked together into a single virtual cache. A particular one of the nodes is designated as a repository node for persistently storing a particular data component and for providing a copy of the particular data component to other referencing nodes of the plurality of nodes which lack, but which desire to access, the particular data component. Designation of the particular node as the repository node is unchanged solely by providing a copy of the particular data component to one of the referencing nodes that desires to access the particular data component. The repository function of a node for a particular data component is relatively static. For instance, assume that a first referencing node obtains from the repository node a copy of the particular data component and performs a group of one or more access operations on the copy of the data component. If another referencing node lacks a copy of, but desires to access, the particular data component, a copy of the particular data component is provided from the repository node to the other referencing node. One of the nodes may be designated as a monitor node for the particular data component. The monitor node responds to requests by each referencing node to identify the repository node of the particular data component by providing the identity of the particular node which serves as the repository node for the particular data component.

58 Claims, 9 Drawing Sheets

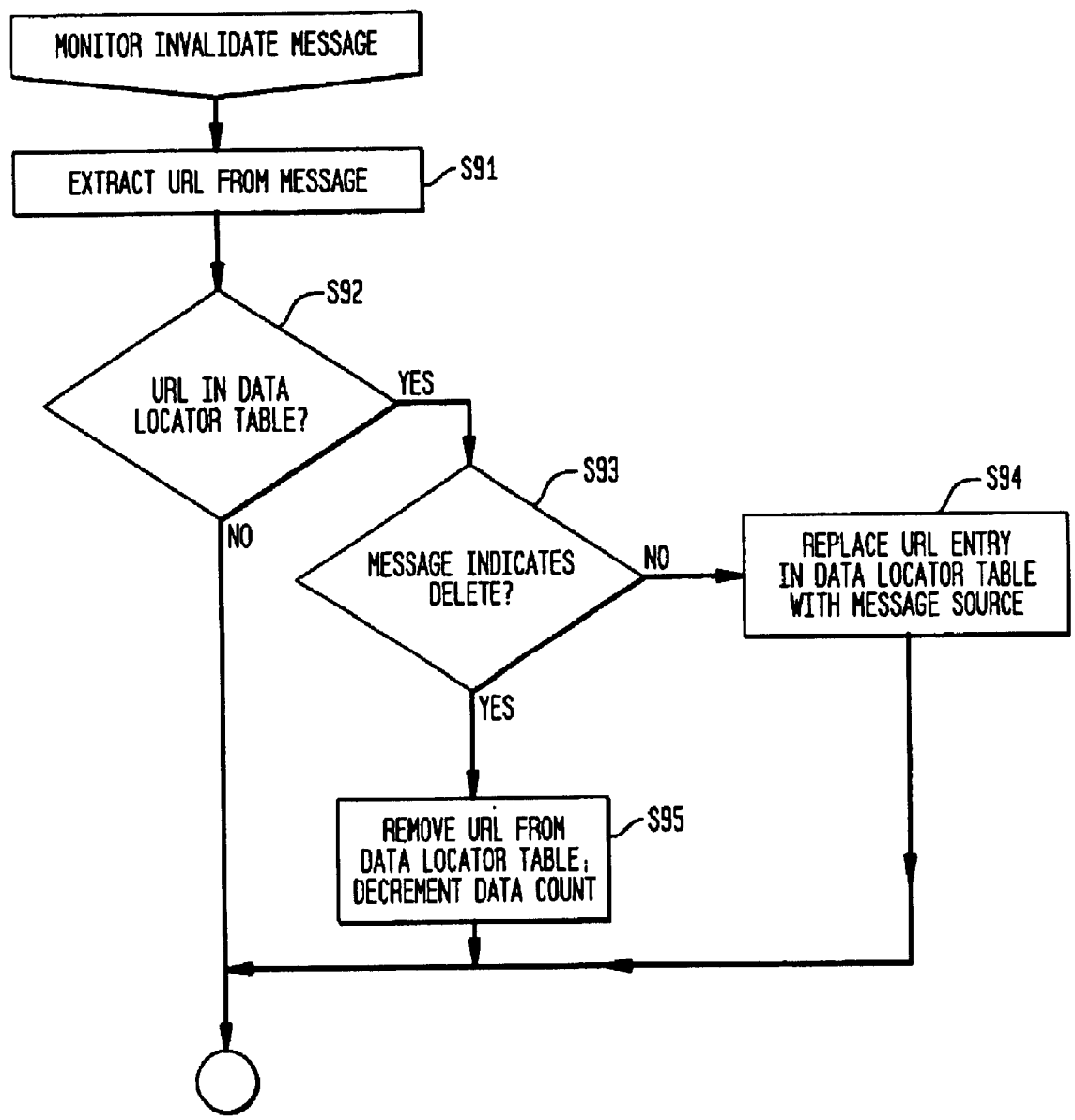

DISTRIBUTED VIRTUAL WEB CACHE IMPLEMENTED ENTIRELY IN SOFTWARE

RELATED APPLICATIONS

This application is based on, and relies on the filing date of, provisional application Ser. No. 60/140,645, entitled "Distributed Virtual Web Cache Implemented Entirely in Software," filed Jun. 23, 1999. The contents of this provisional application are fully incorporated herein by reference.

In addition, this application is related to U.S. Pat. No. 6,026,474, entitled "Shared Client-Side Web Caching Using Globally Addressable Memory," filed Nov. 22, 1996. The above patent is assigned to the assignee of the present application. The contents of the above patent are relevant to the subject matter of the present application and are fully incorporated herein by reference.

FIELD OF INVENTION

The present invention pertains to a network of nodes, such as a local area network of computer systems, in which it is desired to speed up the access by some nodes to data components initially retrieved by other nodes.

BACKGROUND OF THE INVENTION

Broadly stated, a "cache" is a memory provided in a computer system having a higher speed than a main memory of the computer system. The term "cache" is often used to refer to a higher speed memory circuit, e.g., an SRAM, which supplements a slower memory circuit, i.e., a DRAM. However, the term is also commonly used to refer to any form of higher speed memory which supplements a lower speed memory. For example, a (portion of a) hard disk physically local to a computer system, which supplements a remote server, that delivers data to the computer system over a low speed communication link, is also referred to as a cache. Herein, the invention is illustrated for the latter form of cache.

The principle of operation of a cache is as follows. Accesses to program instructions and data by a computer system exhibit the property of temporal locality of reference, i.e., the computer system tends to access the same data or instructions repeatedly. Caches exploit the temporal locality of reference property by storing copies of certain frequently accessed program instructions and/or data. Note that cache memories typically are more costly than main memories and therefore have a much smaller storage space. This is especially true in a scenario where the main memory is a network of servers (e.g., web servers on the Internet), whose cost can be divided by the number of computer systems that access them (numbered in the millions) as compared to the hard disk drive and memory circuits of an individual computer system which serves as the cache for that computer system. Nevertheless, statistically, an overall reduction in access time can be achieved because the computer system is able to perform a high proportion of program instruction and data accesses using the copies in the high speed cache memory as opposed to the original copies in the slower main memory. (Note that program instruction accesses, and to a lesser extent, data accesses, also exhibit the property of spatial locality of reference, according to which the computer system tends to access instructions and data stored in memory locations nearby or adjacent to recently accessed program instructions and data. While cache memories also provide an efficiency as a result of spatial locality of reference, this property is of lower interest in the present application.)

Caching techniques are used extensively in computer systems and networks to achieve many ends. Many general and specific caching solutions are available to meet both general and specific needs.

Once specific use of caching is in the context of accessing "web" pages on the "World Wide Web" or "web". To access the web, a computer system typically executes a web browser application. The web browser is a program which, in the very least, is able to issue commands in message packets via a wide area network, e.g., the Internet, to identify web servers containing content of interest and to retrieve from such web servers the content of interest. Web servers are identified using "universal resource locator" addresses or "URLs" which can be translated to IP addresses of the web servers and other commands for retrieving the content. "Content" is typically in the form of "web pages" or information which can be presented visually and audibly by the web browser on the computer system at which it is executed. Web pages are typically provided in "hypertext markup language" or "html" form including text and formatting commands for instructing a web browser to present audio and video information according to the capabilities of the computer system. Web pages may also contain embedded commands specifying retrieval from a web server of other content information for presentation. Such other content is often referenced by a unique URL. The data which composes a single unit of retrievable content data is referred to herein as a "trinket" or data component. Herein, a data component will be presumed to be an atomic accessible unit of content of a web page. However, this is merely for sake of illustration—those skilled in the art will appreciate the applicability of the invention to data components of other kinds and in other applications.

The manner of constructing web pages as conglomerations of multiple data components provides many advantages including the ability of the content provider to reuse data components in several web pages accessible from the web server. As can be appreciated, this presents an opportunity to exploit the property of temporal locality of reference using a web cache. Thus, most commercially available web browser software packages provide a cache (primarily, a user definable portion of a hard disk on the computer system executing the web browser application) for storing each data component (insomuch as there is space) of each web page retrieved by the user for presentation. This speeds up the presentation of each retrieved web page—rather than downloading each data component each time such data components are incorporated in a web page to be presented, a copy of the data component is instead downloaded once and stored in the cache. Each time the data component is to form part of a presented web page, the copy of the data component in the hard disk is retrieved rather than downloading the data component anew from the web server. Considering that the access time for the copy of the data component in the hard disk drive is often dramatically faster than the time required for downloading the data component from the web server via the Internet, a speed up in presenting web pages is achieved. A parameter is also provided for each data component for indicating the expiration date of the copy of the data component. The web browser can use this parameter to determine whether or not a copy of a data component in the cache has expired and therefore should not be used for presenting the web page. In the case that the web browser determines that the copy of the data component in the cache has expired, the copy of the data component in the cache is discarded and a new copy of the data component is downloaded from the Internet.

In a network of computer systems, such as a local area network (LAN), often many computer systems execute web browsers. Although many of these computer systems are capable of supporting individual direct connections to the Internet, typically each LAN has one or more proxy servers for purposes of achieving all external data communications for the computer systems on the LAN. The web browser applications on each computer system are configured to send all of their messages destined to the Internet to one or more proxy servers. The proxy servers, in turn, forward the messages to the Internet and distribute messages received from the Internet to the appropriate computer system on the LAN.

A number of proxy servers and proxy server applications are available which have web caching capabilities including Microsoft Proxy Server™, distributed by Microsoft™, a company located in Redmond, Wash., and Neoserver™, distributed by Compaq™, a company located in Houston, Tex. These proxy servers maintain their own cache of retrieved data components. If a particular computer system on the LAN attempts to retrieve a data component for which the proxy server already stores a (non-expired) copy, the proxy server delivers to the particular computer system the cached copy. As a result, the data component can be retrieved at the computer system at a higher speed than if the data component was downloaded from the web server via the Internet.

Web browsers can employ a technique called "cached array routing protocol" ("CARP"). According to CARP, when a computer system issues a message to retrieve a specific data component as identified by its URL, the URL is hashed. Based on this hashing, the request is delivered to a specific one of multiple proxy servers. This distributes the caching load over multiple proxy servers of a LAN.

Likewise, several web "cache engines" outside of the LAN are provided for speeding up delivery of data components. Consider that each LAN or computer system is typically connected to the Internet via equipment of an Internet service provider ("ISP") and/or network access provider ("NAP"). These ISPs and NAPs possess facilities with servers for enabling messages, including messages bearing data components, to be communicated between the computer systems and LANs on the one hand, and the web servers on the other hand. The servers of the ISPs and NAPs may also be connected to, or equipped with, "cache engines," i.e., caches, for storing frequently retrieved data components. This enables the ISPs and NAPs to deliver data components to computer systems executing web browsers without the need to retrieve them from the web servers each time such data components are to be accessed. Such centralized cache servers and server software include Cacheflow™, distributed by Cacheflow™ Inc., located in Sunnyvale, Calif., Traffic Server™, distributed by Inktomi™, located in Foster City, Calif., DynaCache™, distributed by Infolibria™, located in Waltham, Mass., Netcache™, distributed by Network Appliance, located in Sunnyvale, Calif., and Cisco 500 Series Cache Engine™, distributed by Cisco™, located in San Jose Calif. These ISP and NAP "cache engines" may employ the so-called "web cache control protocol" ("WCCP") which redirects computer system issued data component retrieval requests from the web servers to the cache engine located at the ISP or NAP facilities. Generally speaking, an ISP or NAP can deliver data components more rapidly from their cache engines (to the computer systems and LANs for whom they provide service) than they can deliver data components from web servers located at arbitrary networks. Simply stated, on average, the data components will incur more delay in the latter case as they likely must be delivered via several private networks.

Other techniques are available for operating ISP/NAP cache engines. See Geoff Huston, Web Caching, The Internet Protocol Journal (http://www.cisco.com/warp/public/759/ipj 2–3/ipj 2–3webcaching.html). Such techniques include Harvest, Squid and the Internet caching protocol "ICP." These techniques employ one or more web proxies operating as the caching engine. Harvest and Squid provide centralized caching solutions. According to ICP, if a proxy server lacks a non-expired copy of a particular data component requested by a computer system, the proxy server issues a query to another proxy server to determine if that other proxy server has a copy of the respective data component. Generally speaking, the proxy servers will have a high speed communication path between them and thus this technique can still provide for a more rapid delivery of data components than obtaining such data components from the web server.

Cache appliances are even available for web server premises for speeding access to their web pages. An example of one such product is Novell ICS™, which is produced by Novell, Inc.™, located in San Jose Calif., but distributed by many original equipment manufacturers including Compaq™, Dell™, a company located in Austin, Tex., and International Business Machines™, a company located in Armonk, N.Y. This caching product causes the web server to retrieve the data components more efficiently so that they are delivered to the requesting computer systems more quickly. Another web cache service, called Freeflow™, is provided by a company called Akamai Technologies Inc.™, located in Cambridge, Mass. According to this service, the data components that form the web pages are migrated to a network of servers maintained by the Freeflow™ service. The web pages on the web server are then redesigned so that the URLs for their data components point to the Freeflow™ network of servers. As such, when a computer system executing a web browser issues a request to the web server for data components, the data components are actually retrieved from a server maintained by the Freeflow™ service. When a data component is requested by a computer system, the Freeflow™ service chooses a particular cache server to deliver the data component which is "near" the computer system which requested the data component, i.e., which can most efficiently deliver the data component.

U.S. Pat. No. 6,026,474 proposes another solution for "web caching." According to this patent document, a portion of the storage space (disk, memory circuit, etc.) of each of multiple computer systems, or nodes, is allocated for use as a globally addressable shared memory space. Each node is provided with a shared memory subsystem control program which enables the node to access the shared memory space. The storage of the shared memory space is divided into atomic units, i.e., pages of, for example, 4 kilobytes. A unique node is assigned for persistently storing each page, wherein the unique node stores each page allocated to it in the portion of the physical memory of the node allocated to the globally addressable shared memory space. A "responsible node" is also assigned for tracking the identity of the persistent storage node of each page. A directory structure is maintained in each node which can be used to identify, for a page with any given global address, the identity of the responsible node that tracks the identity of the node that persistently stores the page with that global address. Another directory structure is also provided at a location in the network well-known to the nodes which maps each file to the global addresses of the pages that compose the file. Thus, to access a file, a node first accesses the well-known location to identify the global addresses of the pages that compose that file. Next, the node accesses its local directory to identify the responsible node for tracking the persistent storage node for each page. The node then issues a query message to the responsible node to determine the identity of the persistent storage node for each page. Once the node has determined the identity of the persistent storage node of a given page, the node can transmit to the node that serves as the persistent storage for the page a message requesting the page.

The '474 patent furthermore mentions that this shared memory space can be used to enable nodes to share the caches of web browser applications installed on the nodes.

Unlike the techniques described above, where the caching is performed at the ISP/NAP or at the web server, this caching technique is performed on the "client side," i.e., at the nodes executing web browsers, or LAN to which they are connected. Client side caching techniques provide many advantages over ISP/NAP side or web server side solutions including:

(a) The operators of the client side nodes or LAN have the option to implement caching and need not rely on the permission or desires of the ISP/NAP and/or web server operators to do so; and (b) Generally speaking, the transfer speed of data on the LAN amongst client side nodes is far higher than the transfer speed of data from the Internet to the LAN or client side nodes. Thus, client side caching solutions have a speed advantage in transferring cached files to the client side nodes.

(Note also that client side caching solutions are not strictly mutually exclusive alternatives for the ISP/NAP side or web server side caching solutions. Rather, these various solutions can be viewed as a hierarchical caching system. Indeed, caching solutions at each of the web server, ISP/NAP and client can be used in conjunction to provide an optimized solution with an average data component retrieval time which is faster than the data component retrieval time of any individual solution used alone.)

However, the technique described in the '474 patent has certain shortcomings. Most significantly, the system of the '474 patent "migrates" the persistent storage of a file from node to node on each access to a file. In other words, not only is a copy of a file provided from a current node, serving as the persistent storage of a file, to a requesting node, the duty of serving as the persistent storage for the file is delegated to the requesting node. This is not always the desired outcome. Especially considering that a responsible node is designated for tracking the node serving as the persistent storage of a file, it is generally inefficient to change the persistent storage node each time a file is accessed.

It is an object of the present invention to overcome the disadvantages of the prior art.

SUMMARY OF THE INVENTION

This and other objects are achieved according to the present invention. According to one embodiment, a method and system are provided for optimizing the local caching of one or more data components available from a server node. Each of plural nodes connected to a local area network is provided with a locally physically present cache. Each of the caches of at least some of the plurality of nodes are linked together into a single virtual cache. A particular one of the nodes is designated as a repository node for persistently storing a particular data component and for providing a copy of the particular data component to other referencing nodes of the plurality of nodes which lack, but which desire to access, the particular data component. Designation of the particular node as the repository node is unchanged solely by providing a copy of the particular data component to one of the referencing nodes which desires to access the particular data component.

Thus, the repository function of a node for a particular data component is relatively static. For instance, assume that a first referencing node obtains from the repository node a copy of the particular data component and performs a group of one or more access operations on the copy of the data component If another referencing node lacks a copy of, but desires to access, the particular data component, a copy of the particular data component is provided from the repository node to the other referencing node. Amongst other things, this reduces the efforts of tracking the identity of the repository node for each data component. Considering that a typical node executing a browser may, over time, access thousands of data components, the reduction on processing resources can be quite substantial.

According to another embodiment, one of the nodes is designated as a monitor node for the particular data component. The monitor node responds to requests by each referencing node to identify the repository node of the particular data component by providing the identity of the particular node which serves as the repository node for the particular data component.

Illustratively, a referencing node, which desires to access a data component it lacks, follows a hierarchical process. The referencing node, obtains from the appropriate monitor node (designated for indicating to referencing nodes the identity of the repository node designated for storing the desired data component) the identity of the appropriate repository node of the desired data component. The referencing node then obtains from the repository node a copy of the desired data component.

Illustratively, referencing nodes may incrementally store information, derived from one or more messages detected in the local area network, identifying various monitor nodes designated for identifying repository nodes (which in turn are designated for storing corresponding data components). In addition or in the alternative, the referencing node may issue a message destined to a group of one or more nodes (e.g., a multicast or broadcast message) requesting the identity of the appropriate monitor node which can identify the repository node storing the desired data component, or group of data components including the desired data component.

BRIEF DESCRIPTION OF THE DRAWING

FIG. 12 shows a flowchart illustrating a monitor invalidate message process according to an embodiment of the present invention.

DETAILED DESCRIPTION OF THE INVENTION

The present invention is illustrated for a web access Internet application, whereby multiple personal computer system nodes connected to a LAN are capable of executing web browser applications. Furthermore, in the illustration, while executing the web browser application, each node attempts to present a web page which is accessible from a web server at a location remote from the LAN, e.g., via a wide area network or the Internet. Each such web page is presumed to be composed of data components, i.e., text, audio data, still pictures, movies, graphical data, applications, etc. However, those skilled in the art will appreciate the applicability of the invention to other applications in which the common accessibility of multiple nodes to data components is desirably optimized.

Figure 1:
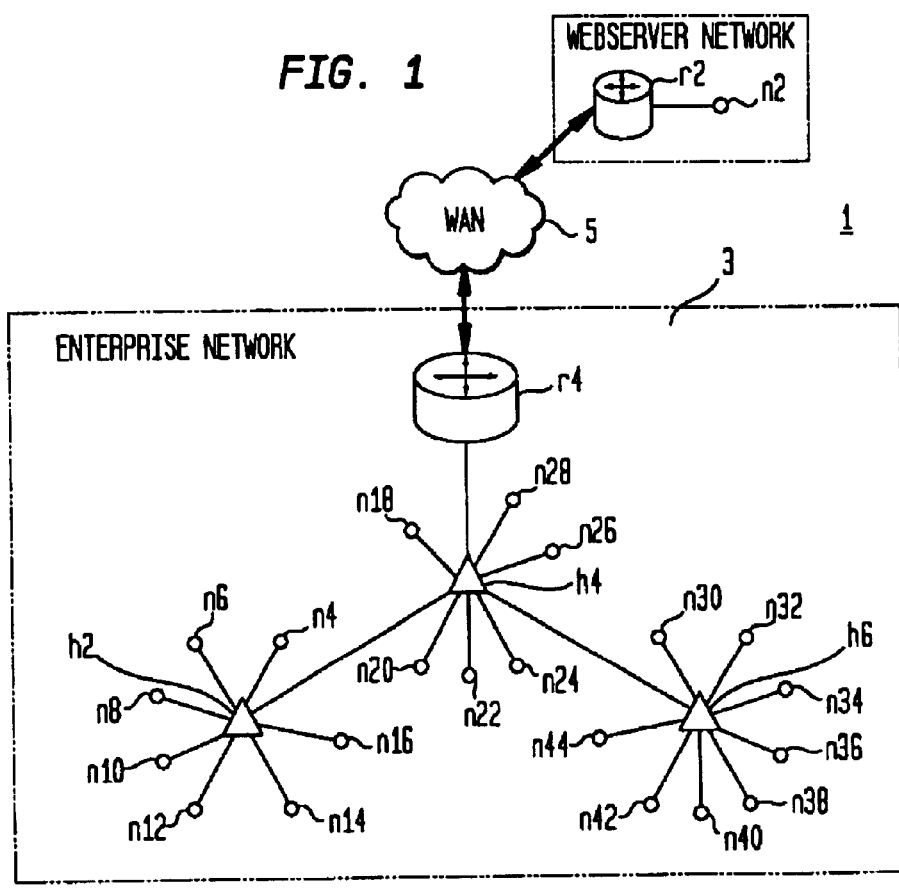
FIG. 1 shows a network in which the invention is used.

FIG. 1 shows a network 1 in which the invention is illustrated. Illustratively, the network 1 includes an enterprise network 3, a wide area network 5 and a web server network 7. Both the enterprise network 3 and the web server network 7 may be Ethernet LANs. The wide area network 5 illustratively is the Internet. As shown, the web server network 7 includes a router r2 and a node n2, which may be a computer system, such as a server. The enterprise network 3 includes a router r4, hubs or switches h2, h4 and h6 and nodes n4, n6, n8, n10, n12, n14, n16, n18, n20, n22, n24, n26, n28, n30, n32, n34, n36, n38, n40, n42 and n44, which may be personal computer systems and/or servers. The routers r2 and r4 serve to route packets to and from the Internet 5. The hubs or switches h2, h4 and h6 serve to repeat communicated data amongst the nodes n4–n44 so as to achieve a virtual bus-like environment amongst the nodes n4–n44. The nodes n2 to n44 perform various processing functions, such as generating and transmitting packets destined to other nodes, receiving and processing packets transmitted from other nodes, and processing the data in received packets.

Generally stated, the Internet 5 is an interconnection of a plurality of private networks maintained by network access providers (NAPs) and Internet service providers (ISP), wherein the interconnection of the networks may be carried by various high capacity (i.e., T1, T3, T4, OC-3, OC-48, etc.) privately leased lines of the telephone network. Communication is achieved in the Internet using a hierarchy of protocols, including the Internet protocol (IP), the transmission control protocol (TCP), and the hypertext transfer protocol (http). Amongst other things, the Internet 5 can carry (in packets) messages for requesting information, and such requested information, from a source node to an appropriate destination node. For example, nodes can "visit web sites" and present "web pages" by issuing queries to specific web servers for web page information. The web servers respond by transferring the requested web page data to the requesting nodes. As the construction and operation of the Internet is conventional, its details are not described further. Needless to say, the transfer of information across the Internet 5, e.g., from the node n2 to the node n20, is generally less efficient (takes a greater time, uses more resources, such as bandwidth, etc.) than the transfer of data within either LAN 3 or 7, e.g., from the node n10 to the node n28.

Figure 2:
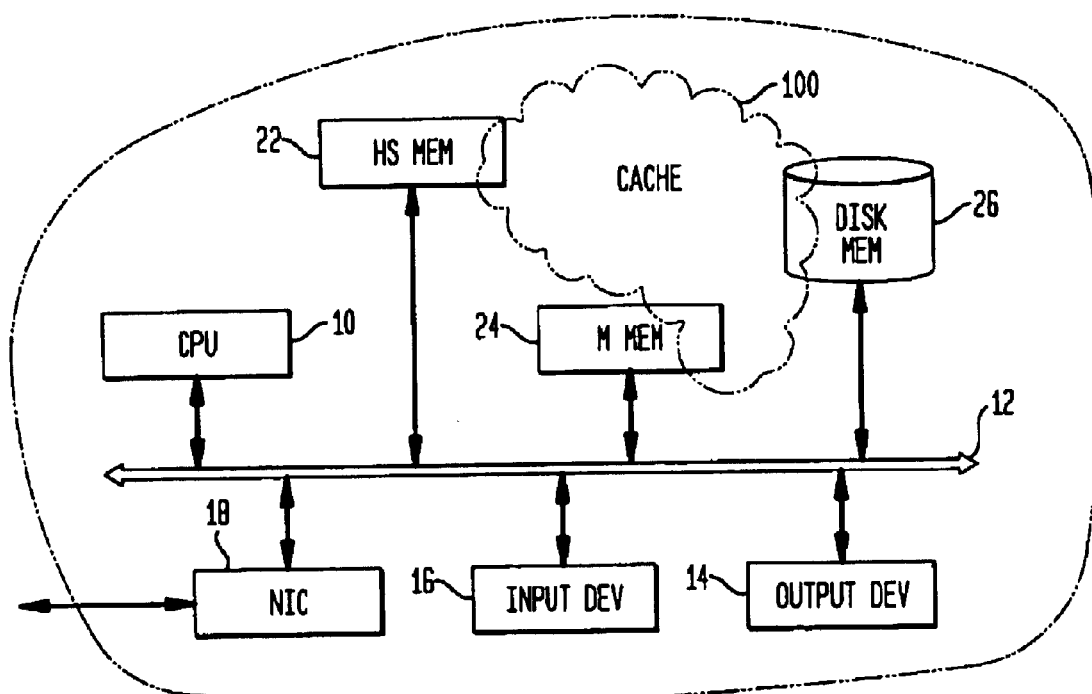
FIG. 2 shows a node according to an embodiment of the present invention.

FIG. 2 shows an illustrative internal construction of the nodes n2–n44 in greater detail. It should be noted that the construction shown in FIG. 2 is illustrative and is furthermore simplified for sake of discussion. For example, the node is shown as having a single bus 12 to which are connected a CPU or processor 10, a high speed memory 22, a main memory 24, a disk memory 26, an I/O device or network interface card (e.g., an Ethernet interface card) 18, an input device 16 (e.g., a keyboard and a pointing device, such as a mouse, track pad, track ball, joystick, etc.) and an output device 14 (e.g., a graphics accelerator and monitor, sound card and loudspeakers, etc.). The high speed memory 22 illustratively contains SRAM circuits for providing general purpose high speed access, i.e., a form of local caching for the node (relative to the main memory 24). The main memory 24, which can be a DRAM or SDRAM, provides the normal volatile working or operating storage for programs and data of the node. The disk memory 26 provides a general persistent storage for the node. The processor 10 executes program instructions and operates on data. For instance, the processor 10 executes program instructions of processes according to the invention, which process instructions may be stored in the memories 22–26. The network interface card 18 communicates messages and data in packets between the node and the LAN on which the node is connected. Amongst other things, the network interface card 18 can distinguish packets with MAC layer addresses destined to the node in question from those that are not. The input device 16 receives input from a human operator, e.g., commands for visiting various web sites. The output device 14 is for presenting audible and visual information to a human operator, e.g., to present audio and video of web pages.

As shown in FIG. 2, a portion of the memories 22–26 is set aside to function as a cache 100 according to the invention. Illustratively, (the processor 10, executing suitable software according to the invention, of) each of at least some of the nodes n4 to n44 assigns at least a portion of its disk memory 26 to the cache 100 (whereas the memories 22 and 24 may be used from time to time, as needed, for the cache according to the present invention). This cache 100 may include the same disk directory or partition normally set aside by a web browser program for locally storing recently accessed data components of a web site. Alternatively, the cache may be a separate disk directory or partition for storing data components. In any event, this type of cache is intended to serve as a memory of more limited storage, but higher access speed, than the "main memory" from which data components are normally accessed, in this case, the web server networks 7 in aggregate.

The caches 100 of the nodes are "linked" together to form a single virtual cache that can be accessed by all of the nodes. In other words, each of the nodes can access the data components stored in each other node forming part of the same virtual cache. This "linking" of caches or "sharing" of data components amongst nodes is effected by an elaborate querying communication procedure according to the invention. The processors 10 of the nodes illustratively execute software programs, and maintain data structures, according to the invention which cause them to communicate as described in greater detail below to achieve the linking of caches to form a virtual cache.

Assume that the processors 10 of the nodes can execute a variety of programs to perform certain functions. For example, a processor 10 of a node may execute a web browser application which enables a human operator to visit various web pages, i.e., to retrieve web pages and present them. A node operating in this capacity will be referred to herein as a browsing node. According to the invention, the processor 10 of a node may execute software to perform one of three functions, namely, (a) referencing, or obtaining a copy of a data component for the browsing node, (b) serving as a repository or persistent storage for a data component and (c) monitoring the identity of the node serving as the repository for a data component. When serving in each of these capacities, a node is referred to herein as a referencing node, a repository node and a monitor node, respectively. Note that a node can assume only one, fewer than all, or all of the above roles, i.e., a node can be any combination of a browsing node, referencing node, repository node and monitor node. Preferably, the role of a node will vary from moment to moment according to the particular processing performed by that node at that moment in time, and the type of message received by that node. Hereinafter, the description omits mentioning that execution is performed by the processors 10 of the nodes and instead, for sake of brevity, the nodes will be said to perform various functions.

In addition, in the discussion below, the nodes are said to transmit and receive packets containing messages and or data components. The specific mechanism by which this is achieved is largely omitted in the description below. Those skilled in the art will appreciate that many circuits and techniques can be used to achieve this end. Illustratively, each node uses its respective processor 10, memories 22–26, network interface card 18 and suitable communication software in a well-known manner in order to transmit and receive packets. Moreover, the nodes illustratively use a TCP/IP protocol for communicating messages and data component bearing packets according to the invention. However, this is merely illustrative.

As noted above, a referencing node serves to reference, or obtain a copy of, a particular data component to be accessed. According to the invention, a referencing node achieves this using a hierarchical access process involving the steps of:

(1) identifying the monitor node for a data component;
(2) querying the monitor node to identify the repository node for a data component, if possible; and
(3) retrieving the data component from the appropriate repository node, if possible. Only if the referencing node fails in this hierarchical process, does the referencing node attempt to retrieve the data component from the Internet in a conventional fashion. This is described in greater detail below.

To assist the referencing node, the referencing node preferable incrementally builds and maintains a monitor table for identifying the monitor nodes for specific data components. Table 1 provides an example of such a monitor table.

TABLE 1

| URL Group | Monitor Location |
|---|---|
| www.uspto.gov/web/menu/pats.html | Pepper |
| www.somehost.com/linkX | Salt |
| www.mango.com/help/genhelp.html | Snort |
| www.somehost.com | Garlic |

The monitor table Table 1 is composed of a series of entries, each entry including at least a pair of elements. The first element of type "URL Group", is an identifier of a group of data components. The referencing node can use this element as an index, i.e., the referencing node can compare the URL Group element of a table entry to the URL of a data component to identify a corresponding matching table entry. The second element of type "monitor location" identifies a particular monitor node last known to the referencing node as designated for identifying the repository node for the corresponding data component having a URL that matches the URL element of the same entry. For example, the referencing node storing Table 1 as its monitor table stores information indicating that the node "Snort" is the monitor node for the data component identified by the URL Group "www.mango.com/help/genhelp.html," i.e., indicating that the monitor node Snort is designated for identifying the repository node for the data component with the URL Group "www.mango.com/help/genhelp.html". However, the URL Group element need not refer specifically to every individual data component but can instead refer to entire groups of data components. One manner of partitioning data components into groups is based on the URL. As can be seen, each URL Group entry contains less information than the URL entries of the data locator table and therefore refers to all data components with the same common URL information. Thus, the first entry "www.somehost.com/link" refers to all data components having the common URL information "www.somehost.com/link" such as the data component with URL "www.somehost.com/linkX/ad.gif" and the data component with the URL "www.somehost.com/linkY/ad.gif". Of course, other manners of grouping the data components is possible. Preferably, the grouping chosen tends to group together data components commonly found on the same web page as these will tend to be found at the same repository node. The use and construction of the monitor table is described in greater detail below.

In addition, it should be noted that a monitor table may be a "local" or a "remote" monitor table. A local monitor table includes all URL Groups for which the referencing node is the monitor node. A remote monitor table includes a list of all known nodes that act as a monitor node, and for each monitor node, the table includes a list of all known URL Groups it monitors.

Further, each monitor node incrementally builds and maintains information in a data locator table that the monitor uses to identify the repository node of particular data components. Table 2 provides an example of a data locator table:

TABLE 2

| URL | Storage Location |
|---|---|
| www.somehost.com/linkX/ad.gif | Salt |
| www.somehost.com/logo.gif | Garlic |
| www.mangosoft.com/ | Snort |
| www.uspto.gov | Snort |

Each entry of the data locator table also has at least two elements. The element of type "URL" is similar to the URL Group of the monitor table in that the element is used as an identifier of data components to index one table entry of the data locator table. Note that the use of URL's for indicating particular data components is preferred in a web environment as this is the same manner for identifying a data component within a web page. Of course, this can be replaced with any suitable identifier. Also, the use of the term "Snort" in Table 1 is for sake of illustration. Preferably, the MAC and/or IP address of the node "Snort" is used in the monitor table entries.

The second element, storage location, is an indication (such as the MAC and IP address) of the repository node known to the monitor node and designated for storing the corresponding data component identified in the same table entry. Preferably, the monitor nodes also maintain a count of the total number of data components for each group for which they are individually designated as the monitor node. The use and construction of the data locator table is also described in greater detail below.

Figure 3:
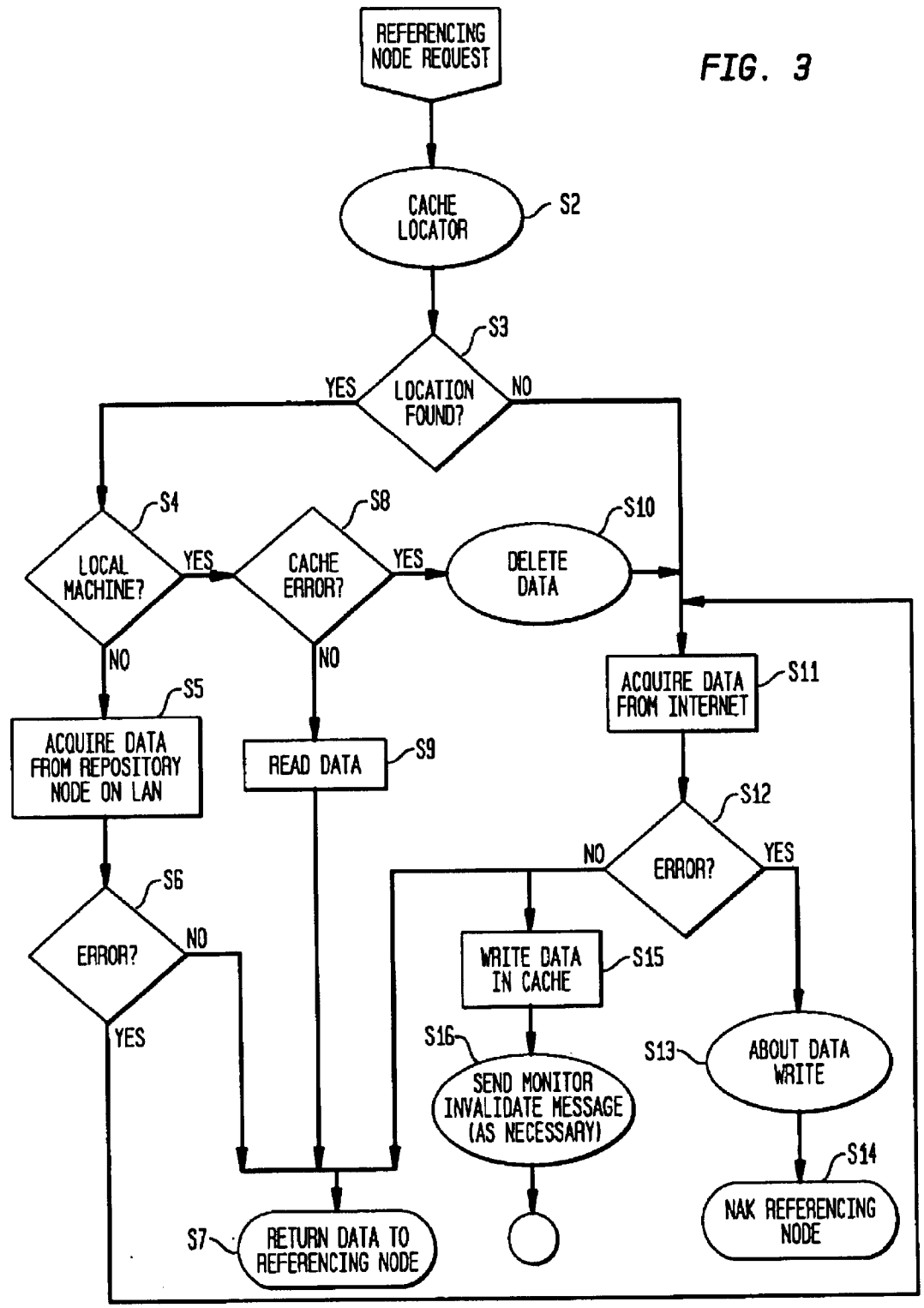
FIG. 3 shows a flowchart illustrating a process according to an embodiment of the present invention.

Referring to FIG. 3, the processing according to the invention is now described. Assume that a browsing node desires to present a web page. In the course of obtaining the data of the web page, the browsing node encounters a command within the web page to retrieve a data component identified by a given URL. According to the invention, the browsing node issues to a particular referencing node a request to retrieve the data component. Illustratively, the particular referencing node selected by the browsing node may be preset. For example, the referencing node can be a designated Internet proxy server. Such a designated proxy server can be set in most web browser applications, such as Microsoft's™ Internet Explorer™. Alternatively, the browsing node and referencing node can be the same node.

In step S2, the referencing node executes a cache locator process according to which the referencing node determines the identity of the repository node designated for storing the data component of interest. This is described in greater detail below. In step S3, the referencing node determines if a repository node had been identified in step S2. If not, step S11 is executed. Amongst other things, a failure in identifying the location of a repository node can occur because the requisite monitor node that can identify it is unavailable (e.g., broken, busy, uninstalled, or not powered on, etc.). However, this also happens when the invention is reset or initialized or a data component is accessed for the first time. In such a case, no repository node is yet designated for storing the data component and no monitor node is yet designated for identifying the repository node. If the referencing node determines that a repository node has been identified in step S3, the referencing node executes step S4 in which the referencing node determines if the referencing node, itself, has been identified as the repository node. If so, the referencing node determines whether or not a cache error has occurred in step S8. A cache error occurs if the data in the cache has expired and therefore should not be used but rather should be discarded. If a cache error is detected, the referencing node executes the delete data process in step S10 and then proceeds to step S11. If there is no cache error, the referencing node reads the data component from its internal cache in step S9. As noted in the flowchart, step S7 is executed by which the repository node returns the data to the referencing node. In the case that step S7 is executed after step S9, the repository node is the referencing node and therefore no significant action actually is performed.

Assume now that in step S4, the referencing node determines that the repository node is not the same as the referencing node which desires to access a copy of the data component (the referencing node lacks the data component). If so, then in step S5, the referencing node attempts to acquire the data component from the identified repository node. This is achieved by the referencing node issuing a message in a packet destined to the referencing node on the LAN which requests a copy of the data component. In step S6, the referencing node determines if an error has occurred. Primarily, an error is detected in step S6 if the repository node issues a reply message in a packet destined to the referencing node indicating that the repository node does not currently store the requested data component in question. This can occur for several reasons including expiration of the copy of the data component at the repository node. If no error is indicated, the repository node provides a copy of the requested data component in step S7. In this case, step S7 is executed after step S6, in which case the repository node and referencing node are different nodes. Thus, the repository node transmits to the referencing node a copy of the requested data component in one or more packets destined to the referencing node. On the other hand, if an error is detected by the referencing node in step S6, then step S11 is executed by the referencing node.

As noted above, execution may arrive at step S11 for one of three reasons, namely: (a) the referencing node could not identify the repository node for the data component in step S3; (b) the referencing node identified itself as the repository node but detected a cache error in step S8, thereby requiring the data component to be deleted in step S10; or (c) the referencing node identified a node other than referencing node as the repository node but detected an error in this identification in step S6. Each of these are indications that a valid, i.e., non-expired, copy of the data component is not present in the virtual cache (i.e., no valid, non-expired copy of the data component is stored in any of the nodes whose caches are linked together to form the virtual cache). As such, the referencing node must attempt to retrieve the data component from the Internet. Thus, in step S11, the referencing node issues a message in a packet via the Internet destined to the web server (as identified using the URL of the data component) requesting a copy of the data component. In step S12, the referencing node determines whether or not an error has occurred in attempting to retrieve the data component via the Internet. Such an error can occur for various reasons including, a failure of the (router or other device providing the) connection of the LAN to the Internet, a failure of the equipment at the web server facilities, etc. If such an error is detected at the referencing node, then in step S13, the referencing node executes an abort data write process described in greater detail below. As described in greater detail below, the abort data write process involves the referencing node communicating with a monitor node for the data component in order to inform the monitor node that the referencing node has failed to retrieve the data component. In step S14, the monitor node, if different from the referencing node, returns a message "not acknowledge" to the referencing node, thereby completing a "handshake" on the failure report.

Assume that in step S12, no error was detected by the referencing node in attempting to obtain a copy of the data component from the Internet. In such a case, the referencing node executes a write data process in step S15 and the send monitor invalidate message process in step S16, if necessary. The writing of data components into the local cache of the referencing node may be performed, e.g., by file system software such as MangoSoft's Medley™. For instance, each data component can be stored in a data file that holds all common root data components (e.g., all www.somehost.com data components) for efficiency.

Also, as shown, step S7 is executed whereby the "repository node" provides the data to the referencing node. However, in this scenario, the referencing node was forced to obtain a copy of the data component from the Internet on account of a failure to locate the repository node, or the repository node not being able to provide a copy of the data component. Therefore, in this case, the referencing node (and the monitor node, if any is designated for this data component) designate the referencing node, itself, the repository node for the data component. Thus, step S7 requires no significant action.

Figure 4:
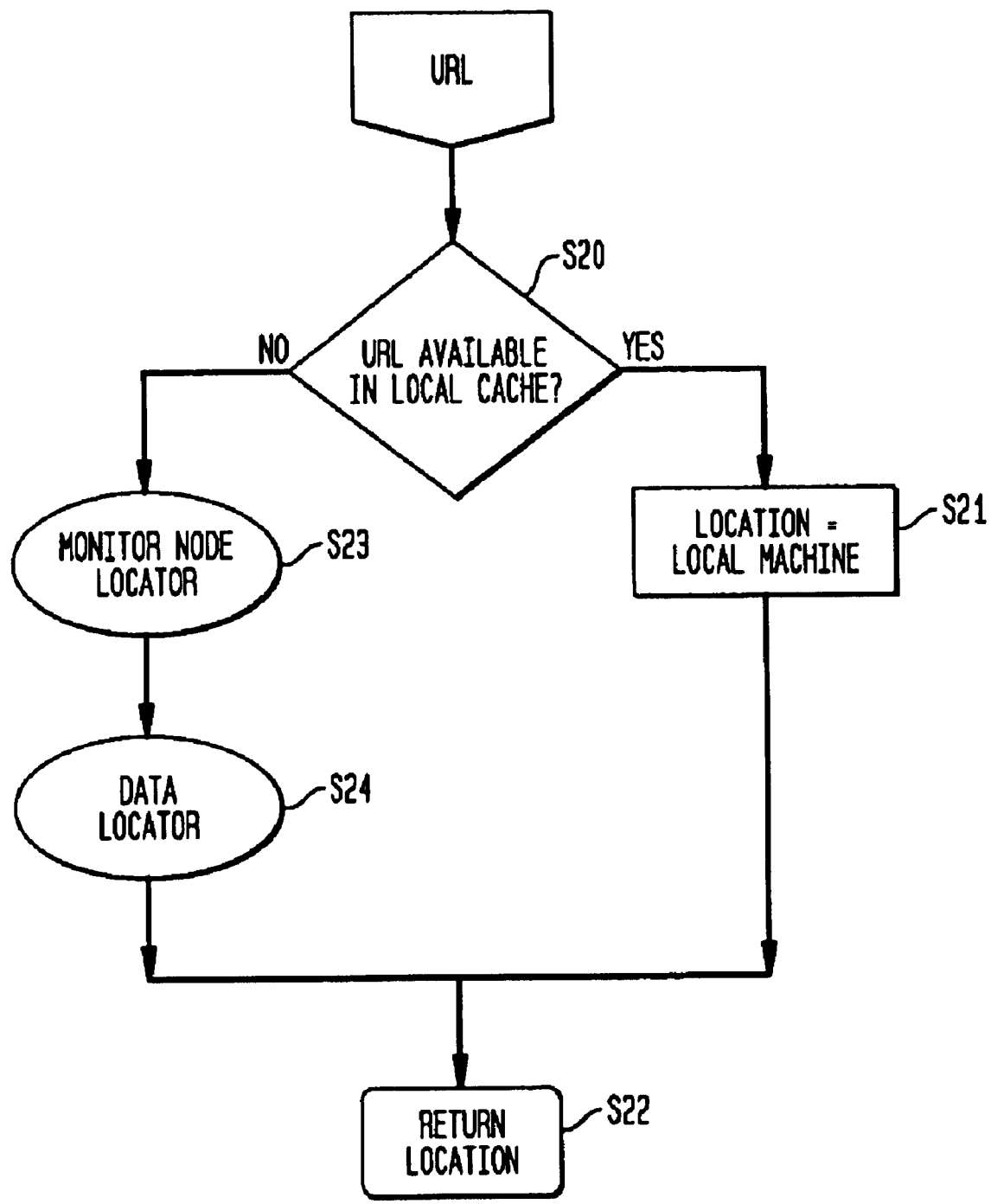
FIG. 4 shows a flowchart illustrating a cache locator process according to an embodiment of the present invention.

Turning now to FIG. 4, the cache locator process is described in greater detail. In step S20, the referencing node determines whether or not the cache of the referencing node, itself, stores the desired data component. Illustratively, the referencing node will look in its local cache (e.g., cache 100 of FIG. 2) to determine whether the desired data component is stored therein. In the alternative, if the referencing node executes a web browser application (e.g., is also the browsing node), then this step can be executed by the referencing node performing the ordinary cache lookup process provided by the web browser application executing thereon. In step S21, if the referencing node determines that the data component is located in its local cache, then the referencing node sets an internal variable "location" to indicate that the referencing node, itself, is the repository node for the data component. The referencing node returns this value as the location of the data component in steps S22. Otherwise, if the referencing node determines that the data component is not stored within the referencing node itself, a monitor node locator process is executed in step S23 followed by a data locator process in step S24. These processes are described in greater detail below. As a result of executing these processes, the internal variable "location" is set to indicate a presumed repository node designated for storing the data component. This value is returned in step S22.

Figure 5:
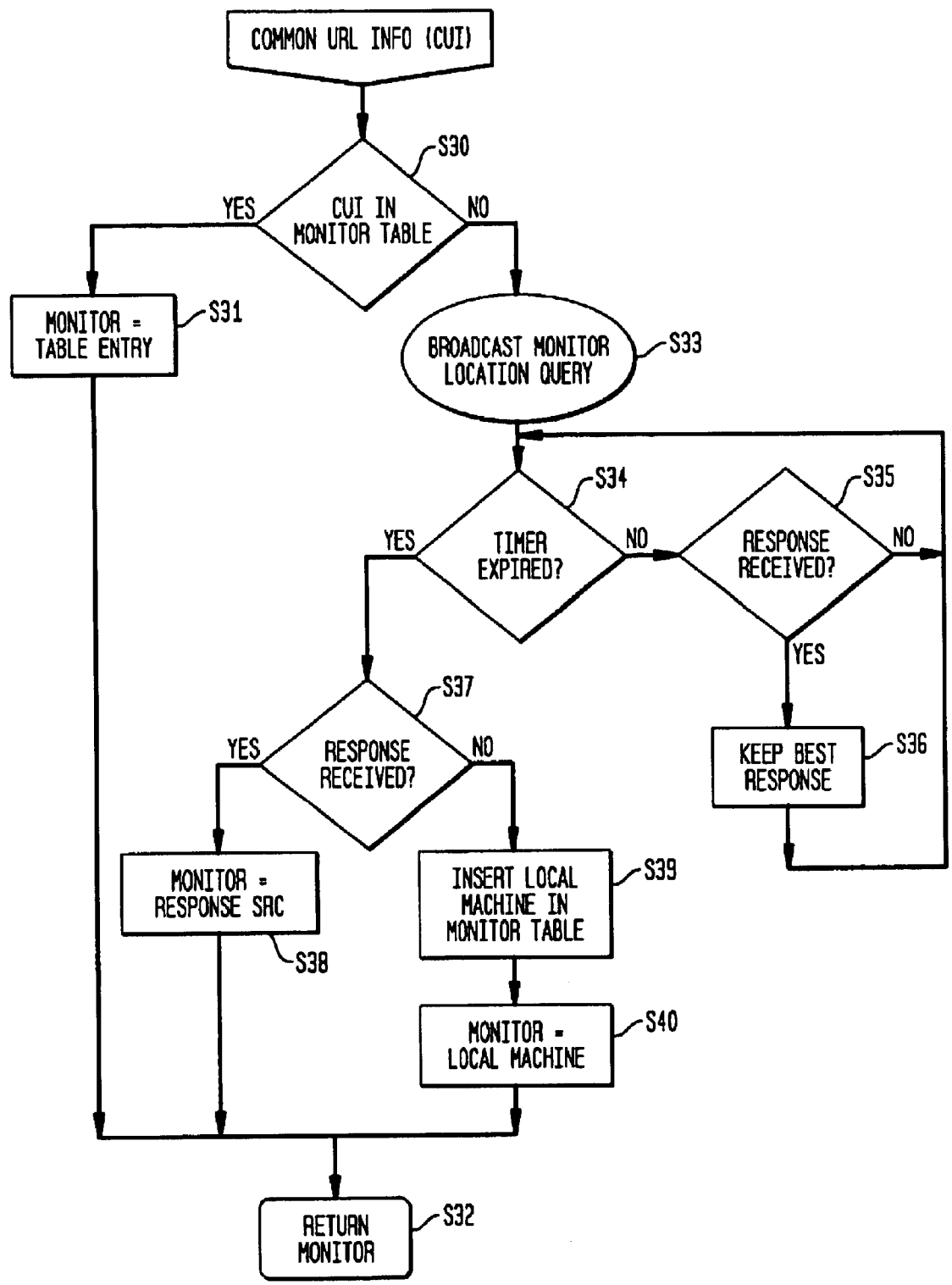
FIG. 5 shows a flowchart illustrating a monitor node locator process according to an embodiment of the present invention.

FIG. 5 illustrates the monitor node locator process in greater detail. In step S30, the referencing node determines if it possesses information indicating the identity of the monitor node designated for identifying the repository node for the desired data component. To that end, the referencing node accesses its monitor table in order to determine if the referencing node has an entry indexed with the same URL Group element as the URL of the desired data component. If so, in step S31, the referencing node sets an internal variable "monitor" to equal the monitor location element in the indexed table entry with the matching URL Group identified in step S30. Then, the referencing node executes step S32 in which the monitor variable value is returned.

If in step S30 the referencing node determines that it lacks the identity of the monitor node designated for the desired data component, the broadcast monitor location query process is executed in step S33. In this process, which is described in greater detail below, the referencing node issues a query message on the LAN requesting the identity of the monitor node for the URL Group for the desired data component. In addition, the referencing node initiates an internal timer to count for a predetermined time period. Next, in step S34, the referencing node determines if its internal timer for gathering responses to its broadcast query has expired. If not, then in step S35, the referencing node determines whether or not it has received a response to its query message. If not, the referencing node returns to step S34.

If a response was received, then in step S36, the referencing node uses some predefined criteria to determine if the received response is "better" than a previously received response. Virtually any criteria may be used by the referencing node to select one monitor node as the best. For example, the predefined criteria could be a count of the total number of data components for each group for which the respective responding monitor node is designated. Thus, if a response is received from a monitor node indicating that it is designated a monitor node for a larger number of data components than indicated in a previously received response, the previously received response is replaced with the recently received response. Otherwise, the recently received response is discarded. Alternatively, the criteria can distinguish the "best" monitor node as the fastest responding monitor node, i.e., the first monitor node to respond within the predefined time period. In such a case, the referencing node can exit from the loop of steps S34–S36 as soon as a response is received.

Eventually, the timer expires in step S34 and the referencing node executes step S37. In step S37, the referencing node determines whether or not any "monitor" nodes responded at all. If so, then in step S38, the referencing node sets its internal variable "monitor" to indicate the monitor node which transmitted the retained response (i.e., the "best" monitor node selected by the step S36) and returns this value in step S32. In addition, the referencing node adds an entry to its monitor table with the URL Group of the desired data component as the URL Group element and the best monitor node as the monitor location element.

Thus, when a referencing node lacks information for identifying the monitor node of a desired data component, the referencing node issues a broadcast or multicast message on the LAN requesting the identity of such a monitor node. Based on the responses received, the referencing node adds an entry to its monitor table so that the referencing node has such information for future use. In this particular embodiment, each referencing node only adds an entry to its monitor table in response to requests sent by that referencing node alone. That is, each response message is addressed to the referencing node (which issued the request message to identify the monitor node for a desired data component) and only this referencing node modifies its monitor table in response to this message. However, in an alternative embodiment, other referencing nodes eavesdrop on the response messages and modify their monitor tables to include such an entry even though such other referencing nodes are not currently attempting to access the desired data component. To that end, the responding monitor nodes can issue their responses in packets containing broadcast or multicast addresses so that the responses can be received by all referencing nodes.

If the referencing node determines that it failed to receive any responses in step S37, then the referencing node determines that no monitor node is designated (or available) for identifying the repository node for the desired data component. As noted above, this can occur because the monitor node is unavailable or because no monitor node has yet been designated for this data component (because, this data component has not been accessed since the most recent reset or initialization of the inventive process.) In such a case, the referencing node designates itself as the monitor node for the desired data component in step S39. In so doing, the referencing/monitor node generates a new entry in its monitor table and inserts in this entry information indicating that the referencing/monitor node, itself, is the monitor node for the desired data component. Such an entry includes the URL Group of the desired data component as the URL Group element and an indication of the referencing/monitor node as the monitor node. The referencing/monitor node then sets the internal variable "monitor" to indicate that the referencing/monitor node, itself, is the monitor node for the desired data component in step S40, and returns this value of monitor in steps S32.

Figure 6:
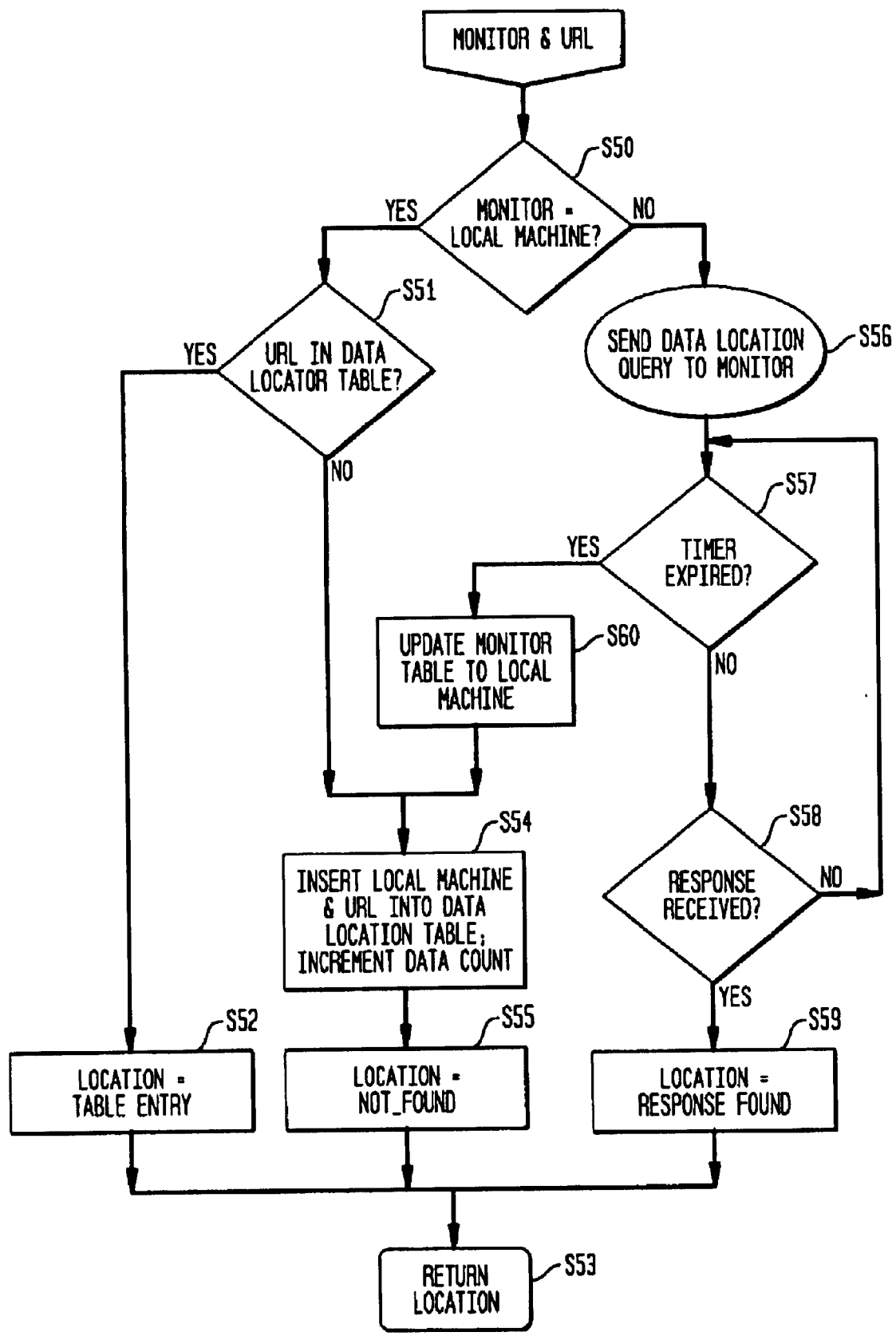
FIG. 6 shows a flowchart illustrating a data locator process according to an embodiment of the present invention.

FIG. 6 illustrates the steps of the data locator process. In step S50, the referencing node determines whether or not the monitor node (identified in the monitor node locator process) is the referencing node, itself. If so, then in step S51, the referencing node (functioning as a potential monitor node) determines if it has information that identifies the repository node for the desired data component. To that end, the referencing/monitor node determines if its data locator table has an entry indexed by a URL element which matches the URL of the desired data component. If so, then in step S52, the referencing/monitor node sets an internal variable "location" equal to an indication of the storage location element of the matching data locator table entry. Then, in step S53, the referencing/monitor node returns this location value.

If in step S51, the referencing node lacks the identity of the repository node (i.e., the data locator table lacks an entry with a matching URL element), then this is an indication that the monitor node indication is incorrect. This can occur for several reasons including the referencing node clearing its data locator table (resetting, clearing, or initializing the referencing node). In such a case, the referencing node designates itself both the monitor node and the repository node for the desired data component. In so doing, the referencing/monitor/repository node generates a new data locator table entry for the desired data component in step S54. That is, the referencing/monitor/repository node inserts the URL of the desired data component into the URL element of the new table entry. The referencing/monitor/repository node inserts as the storage location an identifier for itself. Furthermore, the referencing/monitor/repository node increments its count of the total number of data components for the group corresponding to the new table entry. Then, in step S55, the referencing/monitor/repository node sets the internal variable "location" to indicate a value NOT FOUND and in step S53, returns this value.

Assume now that in step S50, the referencing node determines that it is not the monitor node. If so, then in step S56, the send data locator query to monitor process is executed. As described in greater detail below, in this step S56, the referencing node issues a query message in a packet destined to the monitor (identified in the monitor node locator process) requesting the identity of the repository node for the desired data component. In addition, the referencing node initiates a timer to count for a predetermined period. Next, in step S57, the referencing node determines whether or not the timer has expired. If not, in step S58, the referencing node determines whether or not a response was received from the monitor node. If not, step S57 is executed again. If a response was received, the referencing node sets the "location" variable to indicate the repository node indicated in the returned response. This location value is then returned in step S53.

Assume that the referencing node determines that the timer has expired in step S57. This would indicate that no monitor node response was received in reply to the referencing node's query message requesting the identity of the repository node. In such a case, the referencing node determines that no node currently serves as the monitor or repository node for the desired data component. As such, in step S60, the referencing node designates itself the monitor node for the data component. In so doing, the referencing/monitor node inserts in its monitor table an entry indicating that the referencing/monitor node, itself, is the monitor node for the desired data component. Such an entry includes the URL Group of the desired data component as the URL Group element and an indication of the referencing/monitor node as the monitor node. Next, in step S54, the referencing/monitor designates itself as the repository node for the data component. In so doing, the referencing/monitor/repository node generates a new data locator table entry for the desired data component in step S54. The referencing/monitor/repository node inserts the URL of the desired data component into the URL element of the new table entry. The referencing/monitor/repository node inserts as the storage location element an identifier for itself. Furthermore, the referencing/monitor/repository node increments its count of the total number of data components for the group corresponding to the new table entry. Then, in step S55, the referencing/monitor/repository node sets the internal variable "location" to indicate a value NOT FOUND and in step S53, returns this value.

Figure 8:
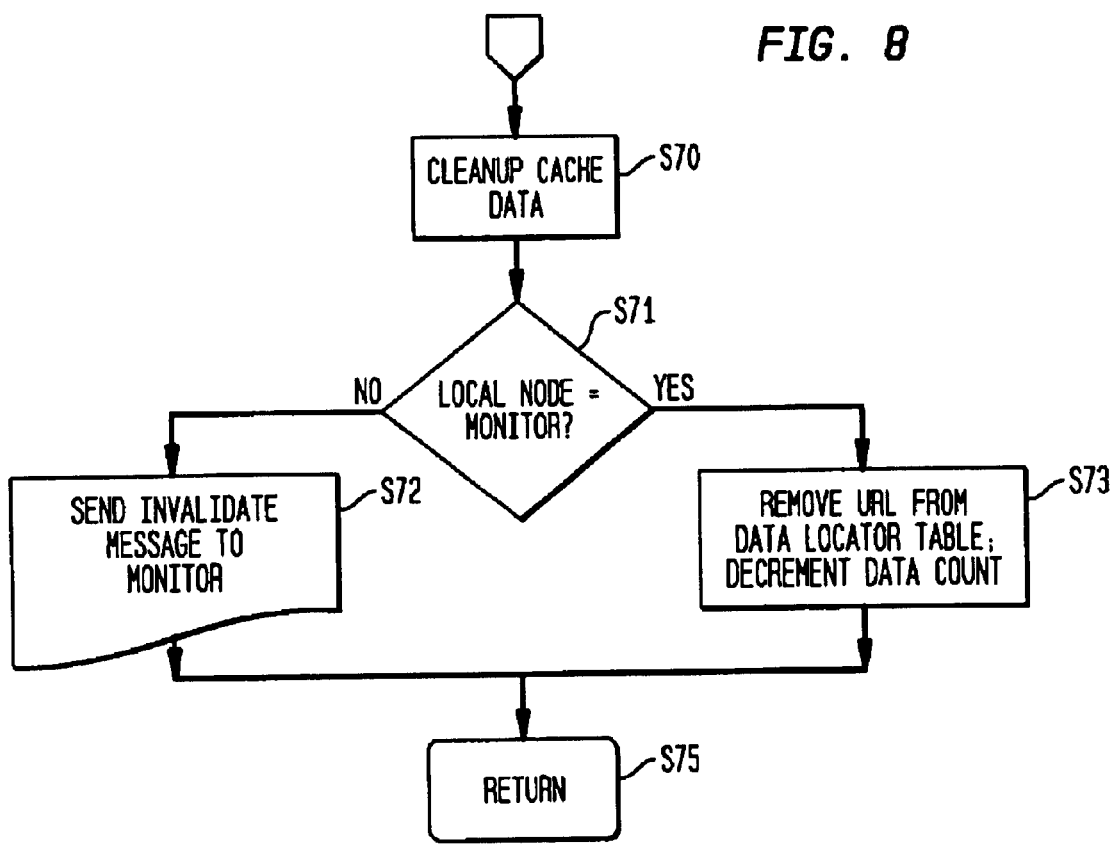
FIG. 8 shows a flowchart illustrating an abort data write process according to an embodiment of the present invention.

FIG. 8 illustrates the abort data write process. In step S70, the referencing node cleans up the cache data, i.e., discards any of the received erroneous data of the data component. In step S71, the referencing node determines whether or not it is currently also designated as the monitor node for the data component. If so, the referencing node deletes the entry of the data locator table which indicates that the referencing node, itself, is also the repository node, and decrements the counter of the number of data components accessible at the referencing node in step S73. The counter is decremented since the referencing/monitor/repository node failed in its attempt to store the desired data component, which counter was incremented in step S54 of FIG. 6. Such failure is caused, e.g., by the unavailability of the node to retrieve the data component from the Internet.

In the alternative, if another node is the monitor node, then the monitor invalidate message process is executed in step S72. After executing either steps S73 or S72, the referencing node ceases execution of the process in step S75.

Note that the abort data write process is executed in step S13 (FIG. 3) after: (a) the referencing node fails to locate the repository node, and therefore assumes that no node currently serves as the repository node for the data component; (b) the referencing node designates itself the repository node for storing the desired data component and attempts to acquire the data component from the Internet; but (c) detects an error in the attempt. Thus, the purpose of steps S72 and S73 is to remove any designation of the referencing node as the repository node.

Figure 9:
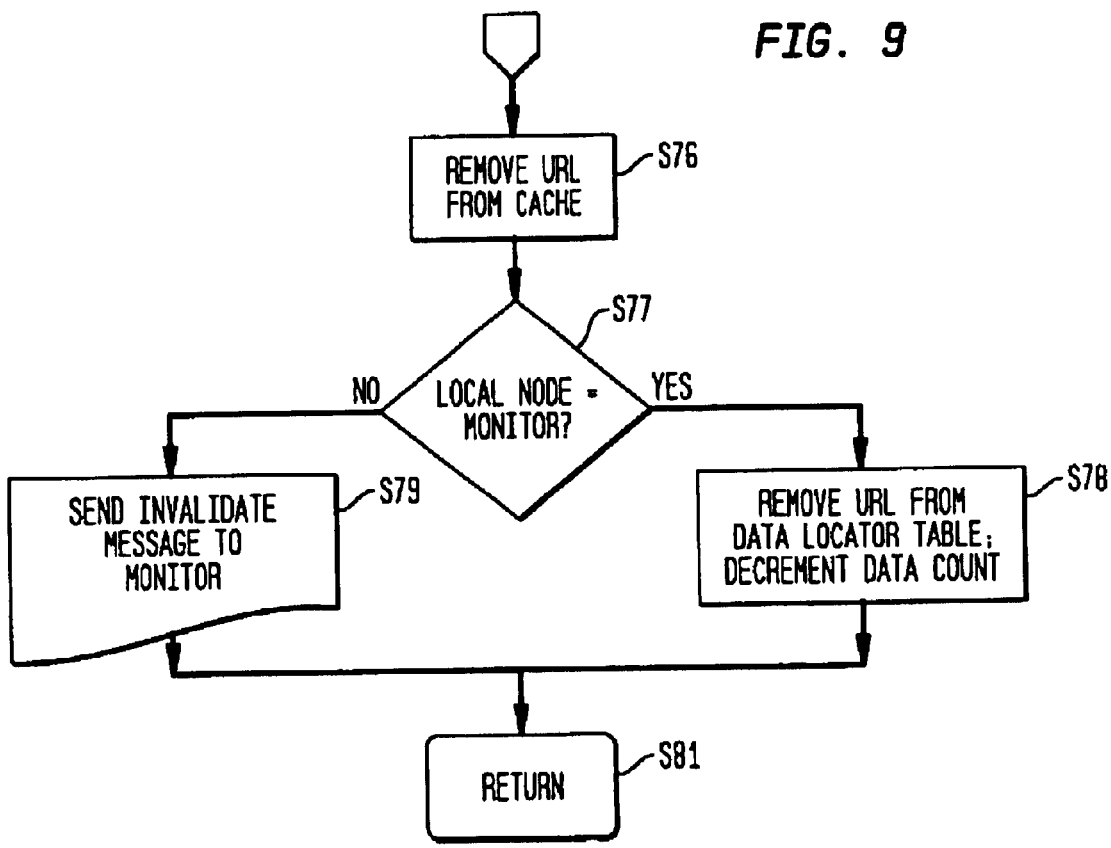
FIG. 9 shows a flowchart illustrating a delete data process according to an embodiment of the present invention.

FIG. 9 illustrates the delete data flow process. In step S76, the referencing node deletes from its internal cache the URL of the desired data component. Next, in step S77, the referencing node determines if it has also currently designated itself as the monitor node. If not, then some other monitor node is currently identifying the referencing node as the repository node. Since the referencing node is discarding its copy of the data component (as a result of the cache error detected in step S8 of FIG. 3), the monitor invalidate message process is executed. Otherwise, the referencing node must also be serving as a monitor node which identifies itself as the repository node for the (discarded) copy of the desired data component. In this alternative case, the referencing/monitor node deletes from its data locator table the entry which identifies the referencing/monitor node, itself, as the repository node for the data component. The referencing/monitor node also decreases by one its count of data components that were deleted (or over-written) and for which it is designated as a monitor. After executing either step S79 or step S78, the referencing node ceases execution of the process in step S81.

Figure 10:
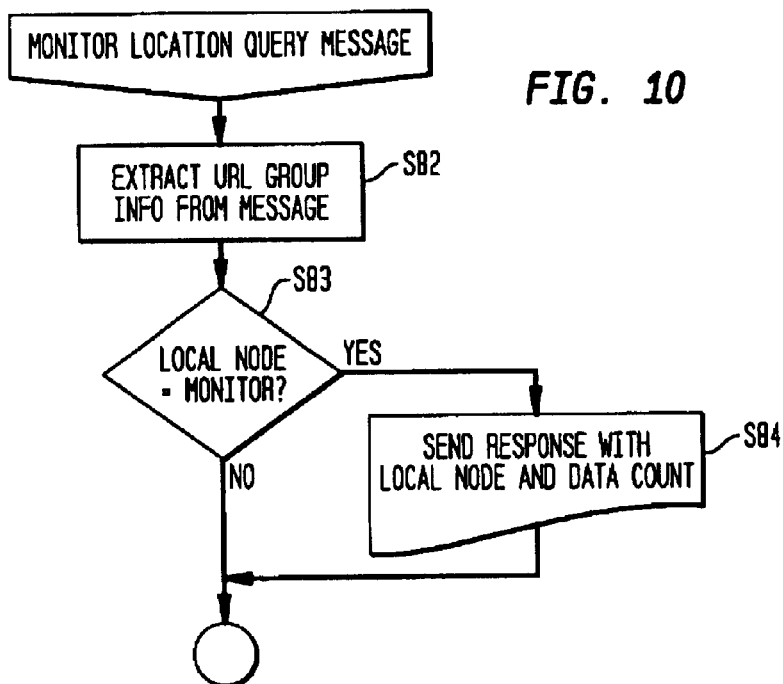
FIG. 10 shows a flowchart illustrating a monitor location query process according to an embodiment of the present invention.

FIG. 10 illustrates in greater detail the monitor location query process. This process is executed in step S33 of FIG. 5. The referencing node transmits on the LAN a packet containing a query message requesting the identity of the monitor node designated for identifying the repository node for the desired data component. The desired data component illustratively is specified in the message by its URL. Illustratively, the packet uses a broadcast address which is received by all nodes. However, a multicast address can also be used, in which case the packet is accepted (at the network layer) by all nodes of the specified multicast group. The monitor location query process is then executed by each monitor node which accepts the query message packet from the referencing node.

In step S82, the monitor node extracts from the query message packet the URL of the desired data component. In step S83, the monitor node determines if the monitor node, itself, is the specific monitor node designated for identifying the repository node of the desired data component. To that end, the monitor node searches its monitor table for an entry having a URL Group element that matches the URL extracted from the query message packet. If the monitor node is designated for the desired data component, in step S84 the monitor node generates and transmits a response packet to the referencing node indicating its identity and the count of the total number of data components for which the monitor node can identify a repository node for this URL Group. Otherwise, the monitor node simply ceases execution of the process.

Figure 11:
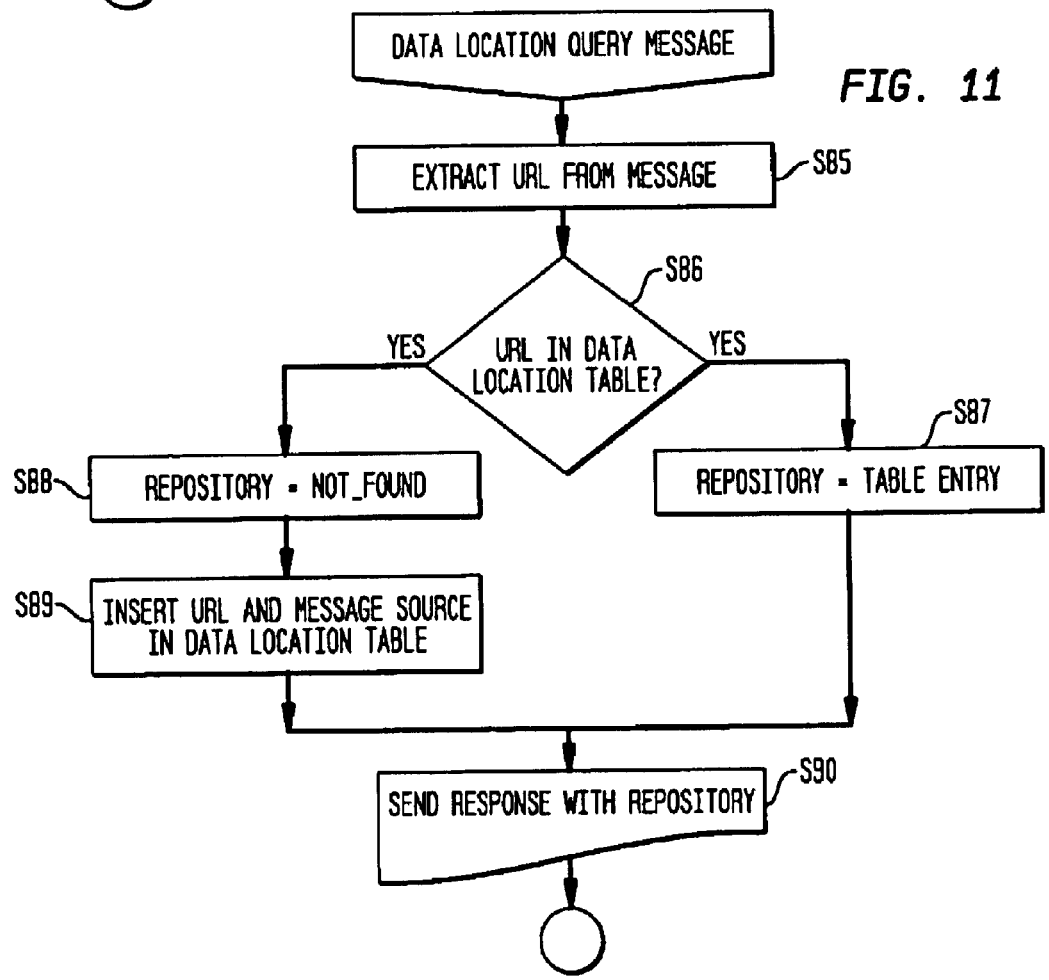
FIG. 11 shows a flowchart illustrating a data locator query process according to an embodiment of the present invention.

FIG. 11 illustrates the data locator query process. This process is executed in step S56 of FIG. 6. The referencing node, having identified a monitor node (ostensibly) designated for providing the identity of the repository node for the desired data component, issues a query message in a packet to the identified monitor node. The query message requests the identity of the repository node for the desired data component. The desired data component is identified in the query by its URL. In step S85, the monitor node extracts from the query message packet the URL of the desired data component. In step S86, the monitor node determines if it knows the identity of the repository node for the data component. This is achieved by the monitor node searching its data locator table for an entry indexed by a URL element that matches the URL extracted from the query message packet. If the monitor node is designated for identifying the repository node of the desired data component, then in step S87, the monitor node sets an internal variable "repository" to indicate the repository node indicated in the storage locator element of the matching data locator table entry.

Otherwise, the monitor node must have incorrect information regarding the repository node. The monitor node therefore takes steps to correct its information so that it will correctly identify the repository. In particular, if the monitor node is incapable of identifying the repository node, the referencing node will designate itself the repository node. The monitor node likewise performs a designation operation, by which the monitor node designates the referencing node as the repository node. In step S88, the monitor node sets the "repository" variable to NOT FOUND. Furthermore, in step S89, the monitor node adds a new entry to its data locator table. The monitor node sets the URL element of the new entry to the URL of the desired data component extracted from the query message packet. The monitor node sets the storage location element to indicate the referencing node (as indicated by the source address information extracted from the received query message packet).

Either after executing step S87 or step S89, the monitor node generates and transmits a response packet addressed to the referencing node containing the value of the repository variable. The monitor node then ceases execution of this process.

FIG. 12 illustrates the monitor invalidate message process. This process is selectively executed in two situations where the monitor node is not the referencing node and incorrectly identified a repository node which could not provide a copy of the desired data component. In one scenario, the monitor node lacked the identity of any repository node to provide to the referencing node (step S86, FIG. 11). As a result, the monitor node created an entry in its data locator table under the assumption that the referencing node would designate itself the repository node (see step S89, FIG. 11). However, the referencing node detected an error while attempting to retrieve a copy of the desired data component from the Internet (step S12, FIG. 3). Thus, the referencing node must send a message packet to the monitor node instructing the monitor node to delete the entry in the data locator table of the monitor node identifying the referencing node as the repository node for the data component.

In the second scenario, the monitor node provided the identity of a repository node (step S87 FIG. 11) but in attempting to contact the repository node (step S5, FIG. 3), the referencing node detected an error (step S6, FIG. 3). The referencing node designated itself the repository node and acquired the desired data component from the Internet (step S11, FIG. 3) without error (step S12, FIG. 3). In this latter situation, the referencing node transmits a message packet to the monitor node instructing the monitor node to update its data locator table to identify the referencing node as the repository node for the data component (step S16, FIG. 3).

In step S91, the monitor node extracts from the received message packet the URL of the data component. In step S92, the monitor node determines if the extracted URL matches a URL element of any entry in its data locator table. If not, the monitor ceases execution of this process. Otherwise, in step S93, the monitor node determines if the message includes a delete instruction. If so, then in step S95, the monitor deletes the matching table entry of the data locator table. The monitor node also decrements by one its count of the total number of URLs for the group which it serves as a monitor node. On the other hand, if the monitor determines in step S93 that the message is not a delete instruction, then in step S94 the monitor over-writes the storage location element of the retrieved table entry with an indication for the referencing node which is the source of the message packet.

Figure 7:
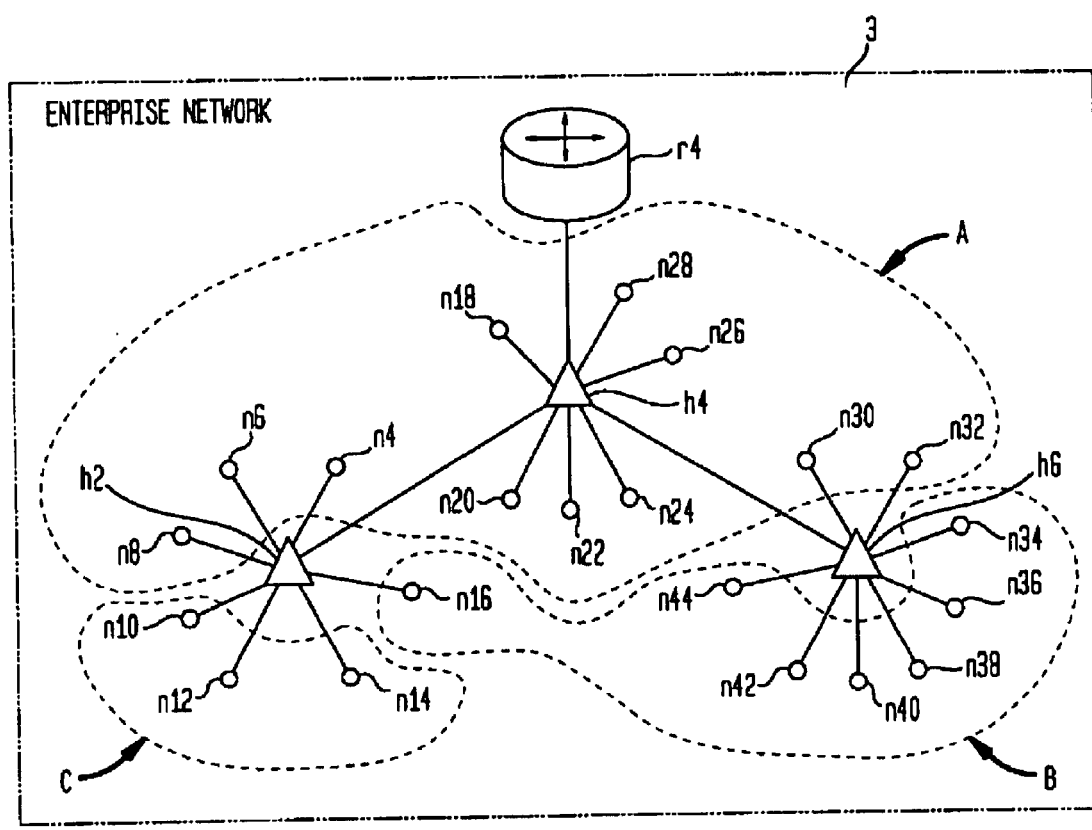
FIG. 7 shows a portion of the network of FIG 1, wherein nodes of the network portion are partitioned into subsets of nodes according to an embodiment of the present invention.

FIG. 7 illustrates the enterprise network 3 of FIG. 1, in another illustrative embodiment of the invention, wherein the nodes of enterprise network (e.g., a LAN) 3 are partitioned into separate, non-overlapping pools or subsets of nodes. As shown, LAN 3 includes three subsets A, B, and C. Subset A includes nodes n4, n6, n8, n18, n20, n22, n24, n26, n28, n30, and n32. Subset B includes n16, n34, n36, n38, n40, n42, and n44. Subset C includes n10, n12, and n14.

A virtual cache is formed for each subset of nodes A, B, and C, i.e., by linking together the caches of each node of each subset only to other nodes of the same subset. This partitioning and separate linking of caches can be achieved in a number of ways. However, one way to do this is to provide to each subset a unique TCP port (not shown). Each node only accepts and processes (at the layers above TCP) the packets with the TCP port number associated with its respective subset. Otherwise, the invention operates similar to that described above, on a subset by subset basis. This pooling technique provides an added advantage of partitioning the caching load over the nodes of LAN 3.

Given the above description of the invention some examples are now described. Consider a point in time where a data component has never been accessed by any node n4–n44 in the LAN 3. Suppose a browser node n8 desires to access a web page for which this data component must be retrieved. Also assume that the browser node n8 is the referencing node. Referencing node n8 executes the cache locator process (step S2 FIG. 3). Referencing node n8 determines that the URL for the data component is not stored in the cache of node n8 (step S20 FIG. 4). Referencing node n8 executes the monitor node locator process (step S23 FIG. 4). Referencing node n8 determines that it lacks in its monitor table an entry for the data component (step S30 FIG. 5). Referencing node n8 executes the broadcast monitor location query (step S33 FIG. 5). Each node (e.g., nodes n6, n10–n44) which functions as a monitor node receives the message and extracts the URL Group of the desired data component (step S82 FIG. 10), but determines that it is not the monitor node for that data component (step S83 FIG. 10). Referencing node n8 waits for a response (step S35 FIG. 5) until the timer expires (step S34 FIG. 5), but none is received (step S37). Thus, referencing node n8 inserts an entry in its monitor table to indicate that node 8 is the monitor for the desired data component (step S39) and returns an indication of itself, i.e., node n8, as the monitor (steps S40, S32 FIG. 5). Next, in executing the data locator process, referencing/monitor node n8 identifying itself as the monitor (step S50 FIG. 6) determines that there is no entry in its data locator table for the desired data component (step S51 FIG. 6). Thus, referencing/monitor node n8 creates an entry in its data locator table for the data component indicating that node n8, itself, is the repository for the data component and increments its data count (step S54 FIG. 6). Referencing/monitor/repository node n8 then returns a "NOT FOUND" location (steps S55, S53 FIG. 6, S22 FIG. 4). Because referencing/monitor/repository node n8 returns a "NOT FOUND" location (step S3 FIG. 3), node n8 attempts to acquire the data component from the Internet and store it in its cache 100 (steps S11, S12, S15 FIG. 3). No monitor invalidate message need be sent.

Now assume that referencing node n10 wishes to access the same data component just stored in node n8. Referencing node n10 also searches for the monitor of the data component, inevitably arriving at step S33 at which referencing node n10 issues a broadcast message requesting the identity of the monitor for the data component. This time, however, when executing step S83 (FIG. 10) monitor node n8 determines that it does, in fact, have an entry for the data component desired by referencing node n10. As such, monitor node n8 transmits a response message indicating that it is a monitor for the data component (step S84 FIG. 10). This response is received by referencing node n10 (step S35 FIG. 5) and is retained (step S36). When the timer expires (step S34 FIG. 5), referencing node n10 determines that a response was in fact received (step S37 FIG. 5) and returns the identifier for the monitor node, namely, monitor node n8 (steps S38, S32 FIG 5). Referencing node n10 also updates its monitor table to include an entry for the data component indicating that monitor node n8 is the monitor for the data component. Next, referencing node n10 determines that the monitor node n8 is not itself (step S50 FIG. 6) and sends a message to the monitor node n8 to identify the repository node (S56). This message is received at monitor node n8, which extracts the URL of the desired data component (S85 FIG. 11), identifies the entry of its data locator table for the desired data component (S86 FIG. 11) and returns the repository node indicated therein (S87, S90 FIG. 11), in this case repository node n8. Before the time expires (S57 FIG. 6) the referencing node n10 receives the response message from the monitor node n8 (S58). The referencing node n10 returns the identification of the repository node for the data component provided in the message, namely, an indication of repository node n8 (steps S59, S53 FIG. 6, S22 FIG. 4). As the referencing node n10 has found the repository node (step S3 FIG. 3) which is not the referencing node n10 itself, (step S4 FIG. 3), the referencing node n10 issues a request to acquire the data component from the repository node n8 (step S5 FIG. 3). Assuming that no error occurs (step S6 FIG. 3), the data component is returned to the referencing node n10 (step S7 FIG. 3). However, if an error occurs, e.g., the repository node n8 determines that the data component has expired, then the repository node n8 refetches the data component from, e.g., server n2 of web server network 7, across the wide-area network 5 of FIG. 1, if a newer version is available from the server n2, and subsequently returns the data component to the referencing node n8. If instead, the server n2 indicates that the current version held by the repository node n8 is still valid, then the repository node n8 returns the existing version of the data component to the referencing node n10 without refetching the data component from server n2. In an alternative embodiment, the repository node n8, upon determining that the copy of the data component has expired, returns an error to the referencing node n8.

Now assume that a referencing node n12 desires to access the same data component. A sequence of steps is performed very similar to that above. Most importantly, the referencing node n12 is provided with the data component from repository node n8 and not node n10. In short, even though repository node n8 provided the data component to referencing node n10, node n8 retained its designation as the repository node.

Now assume that a referencing node n14 desires to access the same data component. However, the copy of the data component stored in repository node n8 has been overwritten by another data component. The sequence of steps is very similar as before. However, when step S5 is executed, the repository node n8 issues a message to the node n14 indicating that node n8 no longer stores a copy of the data component. Thus, when step S6 is executed, referencing node n14 detects an error. This causes referencing node n14 to acquire the data from the Internet (steps S11, S12, S15 FIG. 3) and store it in its cache 100. Assume that no error occurs in obtaining the data component. Referencing node n14 must issue a monitor invalidate message (step S16) to the monitor node n8 so that the monitor node n8 no longer identifies node n8 as the repository node. Rather monitor node n8 should now identify repository node n14 as the repository node for this data component. Thus, referencing/repository node n14 issues a replace message to monitor node n8. Monitor node n8 extracts the URL of the data component from the message (step S91 FIG. 12), obtains the matching table entry from its data locator table (step S92 FIG. 12), and determines that a delete message was not received (step S93 FIG. 12). As such, monitor node n8 replaces the storage location element of the entry to indicate the repository node n14 (step S94 FIG. 12).

Now assume that the node n10 currently lacks the data component but desires again to access it. Similar steps are carried out as before. However, this time, referencing node n10 determines that its monitor table has an entry identifying the monitor node for this data component (step S30 FIG. 5), namely, the monitor node n8. Thus, referencing node n10 returns node n8 as the monitor for the data component (steps S31, S32 FIG. 5). The retrieval of the data component is otherwise similar as before (noting of course than monitor node n8 now identifies repository node n14 as the repository node for the data component so that the data component is now retrieved from repository node n14).

Now assume that node n10 desires to access the same data component, but node n8 is currently unavailable (e.g., broken, busy, uninstalled, or not powered on, etc.). Thus, when referencing node n10 sends a data locator query to the monitor node n8 (step S56 FIG. 6), no response is received (step S58 FIG. 6) before the timer expires (step S57 FIG). As such, the referencing node n10 designates itself the monitor node and the repository node for the data component by: (1) modifying the entry in its monitor table indicating that referencing/monitor/repository node n10 is the monitor node for this data component (step S60 FIG. 6); and (2) adding an entry in is data locator table indicating that referencing/monitor/repository node n10 is the repository node for this data component and incrementing the count of the total number of data components for which referencing/monitor/repository node n10 serves as a monitor (step S60 FIG. 6). The referencing node n10 returns as the location NOT FOUND (steps S55, S53) thereby causing the referencing node n10 to acquire the data component from the Internet (steps S3, S11, S12, S15 FIG. 3). Note that no node invalidation (step S16 FIG. 3) is performed as the referencing node n10 does not know that a monitor node even exists.

Now assume that the node n8 is once again available. As such, there are two monitor nodes for the data component, namely, node n8 and node n10. (Note also that there are two repository nodes for the data component, namely, nodes n14 and n10). Assume now that node n16 desires to access the data component. Referencing node n16 lacks information in its monitor table for identifying the monitor of the data component. As such, node n16 issues a broadcast message requesting the identity of the monitor node (Step S33 FIG. 5). This time, more than one response is received at the referencing node n16 (step S35 FIG. 6), namely, a response from monitor node n8 and a response from monitor node n10. The referencing node n16 selects the best of monitor nodes n8 and n10 which respond to its request (step S36 FIG. 5) using some predefined criteria. The rest of the access is similar to that described above.

Finally, the above description is intended to be merely illustrative of the invention. Those skilled in the art will appreciate numerous alternative embodiments which do not depart from the scope of the following claims.

The claimed invention is:

1. A method of optimizing the local caching of a data component available from a server node comprising the steps of:
   (a) providing to each of plural nodes connected to a local area network a locally physically present cache,
   (b) linking together each of the caches of at least some of the plurality of nodes into a single virtual cache, and
   (c) designating a particular one of the nodes as a repository node for persistently storing a particular data component and for providing a copy of the particular data component to other referencing nodes of the plurality of nodes which lack, but which desire to access, the particular data component,
      wherein designation of the particular node as the repository node is unchanged solely by providing a copy of the particular data component to one of the referencing nodes which desires to access the particular data component.

2. The method of claim 1 further comprising the step of:
   (d) if no valid copy of a data component to be accessed by one of the referencing nodes is available in the virtual cache then selectively obtaining a copy of the data component from a server node, whereby access to the copy of the data component in the virtual cache by one of the referencing nodes is achievable in less time than access to the copy of the data component at the server node.

3. The method of claim 1 further comprising the steps of:
   (d) obtaining from the repository node at a first referencing node a copy of the particular data component,
   (e) performing a group of one or more access operations on the copy of the data component at the first referencing node, and
   (f) after step (d), providing a copy of the particular data component from the repository node to another referencing node which desires to access, but lacks, a copy of the particular data component.

4. The method of claim 1 further comprising the step of:
   (d) designating one of the nodes as a monitor node for the particular data component, the monitor node responding to requests by each referencing node to identify the repository node of the particular data component by providing the identity of the particular node as the repository node for the particular data component.

5. The method of claim 4 further comprising the steps of:
   (e) at least at a first referencing node, incrementally storing information derived from one or more messages detected in the local area network, wherein each detected message identifies a specific node as a monitor node designated for identifying the repository node designated for storing a corresponding data component, and
   (f) at least at the first referencing node, accessing the information in order to attempt to determine the identity of a repository node designated for storing a specific data component that the first referencing node desires to access.

6. The method of claim 5 wherein at least the first referencing node is capable of incrementally storing information derived from the messages detected in the local area network but destined to nodes other than the first referencing node.

7. The method of claim 5 wherein the first referencing node incrementally stores information derived only from those messages detected in the network and destined to the first referencing node.

8. The method of claim 1 further comprising the steps of:
   (d) obtaining at a first referencing node, which desires to access a first data component, from a first monitor node, designated for indicating to referencing nodes the identity of a first repository node designated for storing the first data component, the identity of the first repository node, and
   (e) obtaining at the first referencing node from the first repository node a copy of the first data component.

9. The method of claim 1 further comprising the steps of:
   (d) at least at a first referencing node, incrementally storing information derived from one or more messages detected in the local area network, wherein each detected message identifies a specific node designated as a monitor node for identifying a repository node designated for storing a corresponding data component, and (e) at least at the first referencing node, accessing the information in order to attempt to determine the identity of a repository node designated for storing a specific data component that the first referencing node desires to access.

10. The method of claim 9 wherein at least the first referencing node is capable of incrementally storing information derived from the messages detected in the local area network but destined to nodes other than the first referencing node.

11. The method of claim 9 wherein the first referencing node incrementally stores information derived only from those messages detected in the network and destined to the first referencing node.

12. The method of claim 1 further comprising the step of designating each monitor node for storing a group of data components having common URL information.

13. The method of claim 11 further comprising the step of designating multiple monitor nodes for subsets of data components of a group based on a subdivision of the common URL information.

14. The method of claim 9 further comprising the step of:
(f) issuing from the first referencing node to the identified monitor node a request to identify the repository node of the data component.

15. The method of claim 14 further comprising the steps of:
(g) issuing from the identified monitor node to the first referencing node a message indicating the identity of the repository node of the data component,
(h) issuing from the first referencing node to the repository node identified in the message a request for a copy of the data component, and
(i) issuing from the identified repository node a copy of the data component.

16. The method of claim 14 further comprising the steps of:
(g) receiving from a particular one of the referencing nodes the request to identify the repository node of the data component at the identified monitor node,
(h) if the monitor node lacks the identity of the repository node of the data component, the monitor node designates the particular referencing node as the repository node for the data component of the request.

17. The method of claim 16 further comprising the steps of:
(i) the particular referencing node issuing a message to the identified monitor node which cancels the designation of the particular referencing node as the repository node for the data component if the particular referencing node fails to obtain a copy of the data component.

18. The method of claim 9 further comprising the step of:
(f) if the first referencing node fails to correctly identify the monitor node for the data component using only information stored in the first referencing node, issuing from the first referencing node a message on the local area network destined to a subset of less than all or all of the plurality of nodes requesting the identity of a monitor node designated for identifying the repository node for the data component.

19. The method of claim 18 further comprising the steps of:
if the first referencing node fails to correctly identify the repository node in response to the message transmitted on the local area network requesting the identity of the monitor node, then:

(g) attempting at the first referencing node to retrieve the desired data component from a server node which is connected to the local area network via a wide area network,
(h) storing in the locally physically present cache of the first referencing node the data component, and
(i) the first referencing node designating itself the repository node for the particular data component.

20. The method of claim 19 further comprising the steps of:
(j) if the first referencing node failed to identify the repository node because no monitor node issued to the first referencing node a message indicating the identity of the repository node, in response to the message transmitted on the local area network requesting the identity of the monitor node, the first referencing node designating itself the monitor node for the data component or group of particular data components, including the data component, having common URL information.

21. The method of claim 18 further comprising the steps of:
(g) each of a plurality of monitor nodes responding to the message issued by the first referencing node, by indicating that the respective responding monitor node is the monitor node for the data component specified by the first referencing node, and
(h) the first referencing node selecting the best responding monitor node to be the monitor node for the data component.

22. The method of claim 21 further comprising the steps of:
(i) gathering at the first referencing node each message issued by a responding monitor node within a certain time period after the issuance of the message issued by the first referencing node, and
(j) choosing the best monitor node from the gathered messages according to a predefined criteria.

23. The method of claim 22 wherein the best monitor node chosen by the first referencing node is the responding monitor node which can identify the largest number of data components having common URL information with the data component desired to be retrieved by the first referencing node.

24. The method of claim 22 wherein the best monitor node chosen by the first referencing node is the monitor node whose message is received at the first referencing node before each other message issued by each other responding monitor node.

25. The method of claim 1 further comprising the step of:
(d) designating a plurality of the nodes as the repository nodes for storing a plurality of data components, and
(e) designating a plurality of the nodes as monitor nodes for the plurality of data components, each monitor node responding to requests issued by referencing nodes to identify the repository node of one of the plurality of data components desired to be accessed by the respective referencing nodes, by providing the identity of a particular one of the repository nodes which serves as the repository node designed for storing the desired data component, or group of data components including the desired data component.

26. The method of claim 25 further comprising the steps of:
(f) if a first one of the referencing nodes, which desires to access, but lacks a copy of, a specific data component of the plurality of data components, determines that a specific repository node designated for storing the specific data component is not currently storing the data component, then retrieving at the first referencing node a copy of the specific data component from a server node during a time period of longer duration than would have elapsed if the specific repository node had not failed but rather provided the specific data component, (g) storing the retrieved copy of the specific data component in the first referencing node, and (h) a specific monitor node of the plurality of monitor nodes designating the first referencing node as the repository node for the specific data component.

27. The method of claim 1 further comprising the steps of:

(d) partitioning the plural nodes into a plurality of non-overlapping, non-empty subsets of nodes, (e) performing step (b) on each node of each subset so as to form a plurality of virtual caches, including one virtual cache for each subset wherein each virtual cache is formed by linking together the caches of only the nodes of a corresponding subset, and (f) designating a plurality of repository nodes, each repository node being designated for storing a respective particular data component and for providing a copy of the particular data component only to other referencing nodes within the same subset as the corresponding repository node, each referencing node being a node that desires to access, but lacks, a copy of the respective data component, wherein designation of repository nodes is unchanged solely by providing a copy of one of the particular data components to one of the referencing nodes of the same subset desiring to access the data component.

28. The method of claim 27 further comprising the steps of:

(g) issuing a message on the local area network from one of the plurality of nodes in the course of providing a copy of the particular data component to a specific referencing node, and (h) each node in a subset which is different from the subset of the referencing node, and not part of the same virtual cache as the referencing node, ignoring the message.

29. The method of claim 1 further comprising the steps of:

(d) a referencing node obtaining the particular data component from the repository node for a browsing node, and (e) the browsing node executing a browser application requiring retrieval of one or more data components, including the particular data component, from other nodes.

30. The system of claim 1 wherein the plurality of nodes further comprises:

a first referencing node for obtaining from the repository node a copy of the particular data component, and for performing a group of one or more access operations on the copy of the data component at the first referencing node, and another referencing node, which desires to access, but lacks a copy of, the particular data component, to which the repository node provides a copy of the particular data component, after providing a copy of the particular data component to the first referencing node.

31. The system of claim 1 wherein the plurality of nodes further comprises:

a monitor node designated for the particular data component, the monitor node responding to requests by each referencing node to identify the repository node of the particular data component by providing the identity of the particular node as the repository node for the particular data component.

32. The system of claim 31 wherein the plurality of nodes comprises:

a first referencing node for incrementally storing information derived from one or more messages detected in the local area network, wherein each detected message identifies a specific node as a monitor node designated for identifying the repository node designated for storing a corresponding data component, the first referencing node also for accessing the information in order to attempt to determine the identity of a repository node designated for storing a specific data component that the first referencing node desires to access.

33. The system of claim 32 wherein at least the first referencing node is capable of incrementally storing information derived from the messages detected in the local area network but destined to nodes other than the first referencing node.

34. The system of claim 32 wherein the first referencing node incrementally stores information derived only from those messages detected in the network and destined to the first referencing node.

35. A system for optimizing the local caching of a data component available from a server node comprising:

a plurality of nodes connected to a local area network, the plurality of nodes including a particular one of the nodes designated as a repository node for persistently storing a particular data component and for providing a copy of the particular data component to other referencing nodes of the plurality of nodes which lack, but which desire to access, the particular data component, a plurality of caches, including one locally physically present cache provided to each of the nodes of the plurality, each of the caches of at least some of the plurality of nodes being linked together into a single virtual cache, wherein designation of the particular node as the repository node is unchanged solely by providing a copy of the particular data component to one of the referencing nodes which desires to access the particular data component.

36. The system of claim 35 wherein the plurality of nodes further comprises:

one referencing node for selectively obtaining a copy of the data component from a server node, if no valid copy of a data component to be accessed by the one referencing node is available in the virtual cache, whereby access to the copy of the data component in the virtual cache by the one referencing node is achievable in less time than access to the copy of the data component at the server node.

37. The system of claim 35 wherein the plurality of nodes comprises:

a first referencing node designated for storing a first data component, a first monitor node, designated for indicating to referencing nodes desiring to access the first data component the identity of the first repository node, and a first referencing node, which desires to access the first data component, for obtaining from the first monitor node, the identity of the first repository node, the first referencing node also for obtaining from the first repository node a copy of the first data component.

38. The system of claim 35 wherein the plurality of nodes comprises:
   a first referencing node for incrementally storing information derived from one or more messages detected in the local area network, wherein each detected message identifies a specific node designated as a monitor node for identifying a repository node designated for storing a corresponding data component, the first referencing node also for accessing the information in order to attempt to determine the identity of a repository node designated for storing a specific data component that the first referencing node desires to access.

39. The system of claim 38 wherein at least the first referencing node is capable of incrementally storing information derived from the messages detected in the local area network but destined to nodes other than the first referencing node.

40. The system of claim 38 wherein the first referencing node incrementally stores information derived only from those messages detected in the network and destined to the first referencing node.

41. The system of claim 35 further comprising one or more monitor nodes, each monitor being designated for a group of data components having common URL information.

42. The system of claim 40 further comprising multiple monitor nodes designated for subsets of data components of a group based on a subdivision of the common URL information.

43. The system of claim 38 wherein the first referencing node also is for issuing to the identified monitor node a request to identify the repository node of the data component.

44. The system of claim 43 wherein the identified monitor node is for issuing to the first referencing node a message indicating the identity of the repository node of the data component, and wherein the first referencing node is for issuing to the repository node identified in the message a request for a copy of the data component, and for receiving from the identified repository node, a copy of the data component.

45. The system of claim 43 wherein the identified monitor node is for receiving, from a particular one of the referencing nodes, the request to identify the repository node of the data component, and for designating the particular referencing node as the repository node for the data component of the request, if the monitor node lacks the identity of the repository node of the data component.

46. The system of claim 45 wherein the particular referencing node is for issuing a message to the identified monitor node which cancels the designation of the particular referencing node as the repository node for the data component if the particular referencing node fails to obtain a copy of the data component.

47. The system of claim 38 wherein the first referencing node is also for issuing a message on the local area network destined to a subset of less than all or all of the plurality of nodes requesting the identity of a monitor node designated for identifying the repository node for the data component, if the first referencing node fails to correctly identify the monitor node for the data component using only information stored in the first referencing node.

48. The system of claim 47 wherein if the first referencing node fails to correctly identify the repository node in response to the message transmitted on the local area network requesting the identity of the monitor node, then the first referencing node attempts to retrieve the desired data component from a server node which is connected to the local area network via a wide area network, stores in the locally physically present cache of the first referencing node the data component, and designates itself the repository node for the particular data component.

49. The system of claim 48 wherein if the first referencing node failed to identify the repository node because no monitor node issued to the first referencing node a message indicating the identity of the repository node, in response to the message transmitted on the local area network requesting the identity of the monitor node, the first referencing node designates itself the monitor node for the data component or group of particular data components, including the data component, having common URL information.

50. The system of claim 47 wherein the plurality of nodes comprises:
   a plurality of monitor nodes, each of which is used for responding to the message issued by the first referencing node, by indicating that the respective responding monitor node is the monitor node for the data component specified by the first referencing node,
   wherein the first referencing node is for selecting the best responding monitor node to be the monitor node for the data component.

51. The system of claim 50 wherein the first referencing node is also for gathering each message issued by a responding monitor node within a certain time period after the issuance of the message issued by the first referencing node, and for choosing the best monitor node from the gathered messages according to a predefined criteria.

52. The system of claim 51 wherein the best monitor node chosen by the first referencing node is the responding monitor node which can identify the largest number of data components having common URL information with the data component desired to be retrieved by the first referencing node.

53. The system of claim 51 wherein the best monitor node chosen by the first referencing node is the monitor node whose message is received at the first referencing node before each other message issued by each other responding monitor node.

54. The system of claim 35 wherein the plurality of nodes comprises:
   a plurality of repository nodes designated for storing a plurality of data components, and
   a plurality of monitor nodes designated for the plurality of data components, each monitor node responding to requests issued by referencing nodes to identify the repository node of one of the plurality of data components desired to be accessed by the respective referencing nodes, by providing the identity of a particular one of the repository nodes which serves as the repository node designated for storing the desired data component, or group of data components including the desired data component.

55. The system of claim 54 wherein the plurality of nodes comprises:
   a first referencing node, which desires to access, but lacks a copy of, a specific data component of the plurality of data components, for retrieving a copy of the specific data component from a server node during a time period of longer duration than would have elapsed if the specific repository node had not failed but rather provided the specific data component, and for storing the retrieved copy of the specific data component in the first referencing node, if the first referencing node determines that a specific repository node designated for storing the specific data component is not currently storing the data component, wherein a specific monitor node of the plurality of monitor nodes designates the first referencing node as the repository node for the specific data component.

56. The system of claim 35 further comprising:

a plurality of non-overlapping, non-empty subsets of nodes into which the plurality of nodes are partitioned, a plurality of virtual caches, including one virtual cache for each subset, wherein each virtual cache is formed by linking together the caches of only the nodes of a corresponding subset, and a plurality of repository nodes, each repository node being designated for storing a respective particular data component and for providing a copy of the particular data component only to other referencing nodes within the same subset as the corresponding repository node, each referencing node being a node that desires to access, but lacks, a copy of the respective data component, wherein designation of repository nodes is unchanged solely by providing a copy of one of the particular data components to one of the referencing nodes of the same subset desiring to access the data component.

57. The system of claim 56 wherein one of the plurality of nodes issues a message on the local area network in the course of providing a copy of the particular data component to a specific referencing node, and wherein each node in a subset which is different from the subset of the referencing node, and not part of the same virtual cache as the referencing node, ignores the message.

58. The system of claim 35 wherein the plurality of nodes comprises:

a browsing node for executing a browser application requiring retrieval of one or more data components, including the particular data component, from other nodes, and a referencing node for obtaining the particular data component from the repository node for a browsing node.

* * * * *